US010760216B2

(12) United States Patent
Senti-Wenk et al.

(10) Patent No.: US 10,760,216 B2
(45) Date of Patent: Sep. 1, 2020

(54) STARCH-BASED PHCH

(71) Applicant: Omya International AG, Oftringen (CH)

(72) Inventors: Armelle Senti-Wenk, Wettingen (CH); Patrick A. C. Gane, Rothrist (CH); Joachim Schoelkopf, Killwangen (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 16/393,112

(22) Filed: Apr. 24, 2019

(65) Prior Publication Data

US 2019/0249368 A1 Aug. 15, 2019

Related U.S. Application Data

(62) Division of application No. 14/391,887, filed as application No. PCT/EP2013/058884 on Apr. 29, 2013, now Pat. No. 10,323,356.

(60) Provisional application No. 61/648,638, filed on May 18, 2012.

(30) Foreign Application Priority Data

May 11, 2012 (EP) .................... 12167656

(51) Int. Cl.
| | |
|---|---|
| *D21H 19/54* | (2006.01) |
| *D21H 17/00* | (2006.01) |
| *D21H 17/63* | (2006.01) |
| *D21H 17/69* | (2006.01) |
| *D21H 19/38* | (2006.01) |
| *D21H 19/40* | (2006.01) |
| *D21H 19/42* | (2006.01) |
| *C04B 14/28* | (2006.01) |
| *C04B 16/00* | (2006.01) |
| *C08L 3/08* | (2006.01) |
| *C09C 1/02* | (2006.01) |
| *C04B 103/54* | (2006.01) |

(52) U.S. Cl.
CPC ............ *D21H 19/54* (2013.01); *C04B 14/28* (2013.01); *C04B 16/00* (2013.01); *C08L 3/08* (2013.01); *C09C 1/021* (2013.01); *D21H 17/00* (2013.01); *D21H 17/63* (2013.01); *D21H 17/69* (2013.01); *D21H 19/385* (2013.01); *D21H 19/40* (2013.01); *D21H 19/42* (2013.01); *C01P 2002/88* (2013.01); *C01P 2004/62* (2013.01); *C01P 2006/12* (2013.01); *C01P 2006/22* (2013.01); *C01P 2006/60* (2013.01); *C04B 2103/54* (2013.01)

(58) Field of Classification Search
CPC .............. C01P 2002/88; C01P 2004/62; C01P 2006/12; C01P 2006/22; C01P 2006/60; C04B 14/28; C04B 16/00; C04B 2103/54; C08L 3/08; C09C 1/021; D21H 17/00; D21H 17/63; D21H 17/69; D21H 19/385; D21H 19/40; D21H 19/42; D21H 19/54
See application file for complete search history.

(56) References Cited

U.S. PATENT DOCUMENTS

| | | | | |
|---|---|---|---|---|
| 2,009,020 A ‡ | 7/1935 | Ziborov | ................. | A47K 11/02 |
| | | | | 4/479 |
| 3,459,632 A ‡ | 8/1969 | Jarowenko | ............. | C08B 31/00 |
| | | | | 127/32 |
| 3,873,336 A * | 3/1975 | Lambert | ................ | D21H 17/69 |
| | | | | 106/464 |
| 2007/0266898 A1* | 11/2007 | Gane | ....................... | C09C 1/021 |
| | | | | 106/436 |
| 2009/0020250 A1‡ | 1/2009 | Kimura | ................... | C09C 1/021 |
| | | | | 162/16 |
| 2015/0141547 A1‡ | 5/2015 | Gane | ....................... | C09C 1/021 |
| | | | | 523/33 |

FOREIGN PATENT DOCUMENTS

| | | |
|---|---|---|
| CN | 1984968 A | 6/2007 |
| CN | 102363932 A | 2/2012 |
| EP | 1176255 A1 | 1/2002 |
| WO | 0003091 A1 | 1/2000 |
| WO | 2006008657 A1 | 1/2006 |
| WO | 2006128814 A1 | 12/2006 |
| WO | 2008139292 A1 | 11/2008 |

OTHER PUBLICATIONS

International Search Report dated May 23, 2013 for PCT Application No. PCT/EP2013/058884.
Written Opinion of the International Searching Authority dated May 23, 2013 for PCT Application No. PCT/EP2013/058884.
Office Action dated May 29, 2015 for Chinese Application No. 201380024752.5.
European Search Report dated Jan. 24, 2013 for Application No. EP 12167656.3.
International Preliminary Report on Patentability dated Nov. 11, 2014 for PCT Application No. PCT/EP2013/058884.

\* cited by examiner
‡ imported from a related application

*Primary Examiner* — Shuangyi Abu Ali
(74) *Attorney, Agent, or Firm* — Heslin Rothenberg Farley & Mesiti, P.C.

(57) ABSTRACT

The invention relates to a process for preparing self-binding pigment particle suspensions, to a self-binding pigment particle suspension as well as to a paper product comprising self-binding pigment particles and to the use of the self-binding pigment particle suspension in paper applications, such as in paper coating or as filler material.

20 Claims, No Drawings

STARCH-BASED PHCH

CROSS-REFERENCE TO RELATED APPLICATIONS

This application is a divisional of U.S. application Ser. No. 14/391,887, filed Oct. 10, 2014, which is the U.S. National Phase of PCT Application No. PCT/EP2013/058884, filed Apr. 29, 2013, which claims priority to U.S. Provisional Application No. 61/648,638, filed May 18, 2012, and European Application No. 12167656.3, filed May 11, 2012, the contents of which are hereby incorporated by reference.

The invention relates to a process for preparing self-binding pigment particle suspensions, to a self-binding pigment particle suspension as well as to a paper product comprising self-binding pigment particles and to the use of the self-binding pigment particle suspension in paper applications, such as in paper coating or as filler material.

Mineral materials and binders are among the main constituents used in the manufacture of numerous products such as paints, paper and plastic materials. Therein, mineral materials such as calcium carbonate and other particulate materials contribute mechanical and optical properties, while the binder, generally latex-based and in the form of aqueous suspensions or dispersions, provide the necessary adhesion and cohesion for the respective constituents of the end product to be produced.

In order to avoid the logistic difficulties of handling mineral materials and binders separately, and further to avoid the unwanted physical and chemical interactions developed in comparable mixtures of mineral materials and binders, self-binding pigment particles have been developed and are known to industry. In this regard, self-binding pigment particles having both the properties of the mineral material and of the binder may be directly implemented in a variety of applications. This unique product named self-binding pigment particles refers to distinct, solid particles, formed of mineral material and binder that are intimately bound to one another. The internal cohesion forces of each constituent component and the adhesion between them are such as to provide the self-binding pigment particles with excellent mechanical stability.

Self-binding pigment particles are prepared by a process implementing at least one step of grinding mineral materials in the presence of binder, where grinding refers to an operation leading to a reduction in the particle size; the mineral materials in the self-binding pigment particles have a smaller diameter than the initial mineral material used to produce them. Such self-binding pigment particles are described in a number of documents, including WO 2006/008657, WO 2006/128814, and WO 2008/139292. Unpublished European Patent Application Number 11 160900.4 describes a process for the preparation of self-binding pigment particles comprising the steps of: a) providing an aqueous mineral pigment suspension, b) providing at least one polymeric binder, wherein the binder comprises at least one carboxymethylcellulose having a degree of carboxylation in the range of 0.4 to 2.0 and having an intrinsic viscosity in the range of 3 to 300 ml/g, c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c). Unpublished European Patent Application Number 11 160926.9 describes a process for preparing of self-binding pigment particles comprising the steps of: a) providing an aqueous mineral pigment suspension, b) providing at least one polymeric binder, wherein the binder comprises at least one modified polysaccharide having a degree of carboxylation in the range of 0.4 to 2.0 and having an intrinsic viscosity in the range of 3 to 300 ml/g, wherein the carbon of the binder shows a rate of nuclear transformation of $^{14}C$ to $^{12}C$ of between 900 and 920 transformations per hour and per gram carbon in the binder; c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c) until the fraction of self-binding pigment particles having a particle size of less than 1 µm is greater than 5 wt.-%, based on the total weight of the pigment particles, the foregoing and other objects are solved by the subject-matter as defined herein in the present invention. Furthermore, EP 1 105 571 B1 refers to an additive composition for paper making to be added to the pulp prior to web formation, said composition containing as its basic component components made from starch, the molecular size has been reduced to effect a viscosity level of 10 to 400 mPas (5%, 60 C, Brookfield), and which has been cationized by solution, cationizing using a quaternary nitrogen compound to a charge of <4 mEq/g and at least one additional component, which is 1) a starch-based polymer dispersion which contains starch and a monomeric graft copolymer of, calculated on the dry-matter content of the product, a) 5 to 40% of starch, cationized to have a degree of substitution of 0.01 to 1 and an intrinsic viscosity of >1.0 dl/g, b) 60 to 95% of a monomer mixture containing at least one vinyl monomer and having a film formation temperature of 0 to 70° C. of a polymer formed therefrom, and water, 2) polyamide epichlorhydrin resin (PAAE). Additionally, the applicant is aware of a trade product of Specialty Minerals Inc., Bethlehem, USA on the international market called FulFill™ E-325, which is a large granule of starch/PCC for higher filler loading of base paper. Due to the presence of these coarse particle clusters having a particle size of more than 100 µm, no individual self-binding pigment particles are observed. Paper filled with such coarse particle clusters is susceptible to dusting and coating scratches. The article "Improvement of paper properties using starch-modified precipitated calcium carbonate filler" of Zhao et al., TAPPI Journal 2005, vol. 4(2), is concerned with commercial precipitated calcium carbonate fillers that have been modified with corn and potato raw starches. These modified fillers were used as papermaking fillers to improve the strength in high filler content papers.

For completeness, the Applicant would like to mention the following applications in its name, which also refer to processes for preparing self-binding pigment particles: unpublished European Patent Applications with filing numbers 11 160900.4, 11 160926.9, 11 179604.1 and 11 179572.0.

However, there is one specific problem which very often has significant impact on the mechanical and optical properties of paper coatings made from such self-binding pigment particles. As set out above, self-binding pigment particles contain an intimate combination of mineral material and binder, which are typically provided in form of an aqueous suspension. The provision of a self-binding pigment particle suspension, however, often results in paper coatings imparting not well-adjusted mechanical and optical properties to the corresponding end product. More precisely, the mechanical and optical properties are worsened due to the presence of high amounts of free dissolved binder in the coating color and the subsequent paper product coated with such a coating color. Consequently, a high amount of free dissolved binder in the self-binding pigment particle suspension provides significantly decreased mechanical and optical properties to the end product. The resulting poor properties are especially detrimental for applications in the field of paper coatings as well as paints and plastics.

Thus, there is still a need in the art for providing a process which avoids the foregoing disadvantages and especially allows for improving the mechanical and optical properties of a coating resulting from self-binding pigment particles being derived from a suspension of self-binding pigment particles. In other words, it would be desirable to provide a method which leads to self-binding pigment particle suspensions wherein the resulting paper product coated with said suspension has higher mechanical and optical properties compared to prior art methods.

Accordingly, it is an objective of the present invention to provide a process for preparing a self-binding pigment particle suspension wherein the resulting paper coating of said suspension has improved mechanical and optical properties and especially a reduced content of free dissolved binder. Further objectives can be gathered from the following description of the invention.

According to a first aspect of the present invention, a process for preparing self-binding pigment particles, comprising the following steps of:
a) providing an aqueous pigment material suspension;
b) providing at least one anionic and/or amphoteric starch;
c) mixing the starch of step b) with the aqueous pigment material suspension of step a), wherein the starch is added to the aqueous pigment material suspension in an amount from 0.5 to 20 wt.-%, based on the total weight of the dry pigment in the suspension, and
d) combining the aqueous pigment material particles and starch of step c) by grinding such that the amount of free starch in the obtained suspension is less than 50 wt.-% based on the total amount of starch added in step c) and the pigment material surface charge after step d) is neutral or anionic.

The inventors surprisingly found that the foregoing process according to the present invention leads to a self-binding pigment particle suspension providing mechanical and optical properties to paper coatings made thereof being higher than the mechanical and optical properties of a corresponding coating prepared from a self-binding pigment particle suspension being treated the same way but without contacting it with said at least one anionic and/or amphoteric starch (step c)).

It should be understood that for the purposes of the present invention, the following terms have the following meaning:

The term aqueous "pigment material" suspension in the meaning of the present invention encompasses natural and/or synthetic materials, like calcium carbonate, talc, chalk, dolomite, mica, titanium dioxide etc.

The term aqueous pigment material "suspension" in the meaning of the present invention comprises insoluble solids and water and optionally further additives and usually contains large amounts of solids and, thus, is more viscous and generally of higher density than the liquid from which it is formed.

The term "starch" in the meaning of the present invention refers to polymeric carbohydrate structures, formed by a plurality of glucose units joined together by glycosidic bonds. These structures may be linear, but may also contain various degrees of branching.

The term "anionic" in the meaning of the present invention refers to a compound having a net negative charge. Said compound is typically modified with anionic groups. The term "anionic" does not exclude the presence of cationic groups provided that the sum of individual charges is negative.

The term "amphoteric" or "neutral" in the meaning of the present invention refers to a compound modified with anionic groups as well as cationic groups such that the number of negative charges in the anionic groups is about equal to the number of positive charges in the cationic groups.

The term "free starch" in the meaning of the present invention refers to the amount of starch in the liquid phase of the self-binding pigment particle suspension passing a membrane filter having a pore size of 0.2 micron.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

Another aspect of the present invention is directed to a self-binding pigment particle suspension obtainable by the process.

A further aspect of the present invention is directed to a paper product comprising self-binding pigment particles, wherein the pigment particles are at least partially coated with at least one anionic and/or amphoteric starch.

A still further aspect of the present invention is directed to the use of the self-binding pigment particle suspension in paper applications such as in paper coating. It is preferred that the self-binding pigment particle suspension is used in paper coating applications as a support for rotogravure and/or offset and/or digital printing and/or flexography and/or decoration surfaces. Another aspect of the present invention is directed to the use of the self-binding pigment particle suspension in paper applications such as filler material. It is preferred that the filler material is used in plastics, paint, concrete and/or agricultural applications. It is also preferred that the self-binding pigment particle suspension is used to reduce sun light and UV exposure of plant leaves.

When in the following reference is made to preferred embodiments or technical details of the inventive process for preparing self-binding pigment particle suspensions, it is to be understood that these preferred embodiments and technical details also refer to the inventive self-binding pigment particle suspension, the inventive paper product comprising a pigment material as well as to the use of the self-binding pigment particle suspension defined herein and vice versa (as far as applicable). If, for example, it is set out that the aqueous pigment material suspension provided in the process for preparing self-binding pigment particle suspensions comprises a pigment material selected from the group comprising calcium carbonate, calcium carbonate containing minerals, mixed carbonate based fillers, or mixtures thereof, also the inventive self-binding pigment particle suspension, the inventive paper product comprising a pigment material as well as the use of the self-binding pigment particle suspension preferably comprise a pigment material selected from the group comprising calcium carbonate, calcium carbonate containing minerals, mixed carbonate based fillers, or mixtures thereof.

According to one preferred embodiment of the inventive process for preparing self-binding pigment particle suspensions, the pigment material suspension of step a) comprises a pigment material selected from the group comprising calcium carbonate, calcium carbonate containing minerals, mixed carbonate based fillers, or mixtures thereof, and wherein the calcium carbonate containing minerals preferably comprise dolomite, and the mixed carbonate based fillers are preferably selected from calcium associated with magnesium, clay, talc, talc-calcium carbonate mixtures, calcium carbonate-kaolin mixtures, or mixtures of natural calcium carbonate with aluminium hydroxide, mica or with synthetic or natural fibers or co-structures of minerals, preferably talc-calcium carbonate or talc-titanium dioxide or calcium carbonate-titanium dioxide co-structures.

According to another preferred embodiment of the inventive process for preparing self-binding pigment particle suspensions, the calcium carbonate is a ground natural calcium carbonate, a precipitated calcium carbonate, a modified calcium carbonate, or a mixture thereof.

According to yet another preferred embodiment of the inventive process for preparing self-binding pigment particle suspensions, the at least one starch of step b) is an anionic starch comprising anionic groups selected from the group comprising carboxyl groups, carboxymethyl groups, carboxymethyl hydroxypropyl groups, carboxymethyl hydroxyethyl groups, phosphate groups, sulfonate groups and mixtures thereof, preferably the anionic group is selected from carboxyl groups and carboxymethyl groups According to one preferred embodiment of the inventive process for preparing self-binding pigment particle suspensions, the at least one starch of step b) is an anionic starch having a degree of carboxylation in the range of 0.001 to 0.08, preferably in the range of 0.0025 to 0.06, more preferably in the range of 0.0025 to 0.05 and most preferably in the range of 0.008 to 0.05.

According to another preferred embodiment of the inventive process for preparing self-binding pigment particle suspensions, the at least one starch of step b) is an amphoteric starch comprising anionic groups selected from the group comprising carboxyl groups, carboxymethyl groups, carboxymethyl hydroxypropyl groups, carboxymethyl hydroxyethyl groups, phosphate groups, sulfonate groups and mixtures thereof and cationic groups selected from the group comprising amino groups, immonium groups, ammonium groups, sulfonium groups, phosphonium groups and mixtures thereof, preferably the anionic group is selected from carboxyl groups and carboxymethyl groups, and the cationic group is selected from tertiary amino groups and quaternary ammonium groups.

According to yet another preferred embodiment of the inventive process for preparing self-binding pigment particle suspensions, the at least one starch of step b) has a ratio between the degree of anionic substitution and the degree of cationic substitution ($DS_a/DS_c$) of the hydroxyl groups of more than 0.8, preferably of more than 0.9 and most preferably equal 1.0.

According to one preferred embodiment of the inventive process for preparing self-binding pigment particle suspensions, the at least one starch of step b) is in form of a starch solution or a starch suspension or a dry material, preferably in form of a starch suspension.

According to another preferred embodiment of the inventive process for preparing self-binding pigment particle suspensions, the at least one starch of step b) is in form of a starch solution or starch suspension having a starch concentration from 1 wt.-% to 50 wt.-%, preferably from 10 wt.-% to 50 wt.-%, more preferably from 15 wt.-% to 45 wt.-% and most preferably from 20 wt.-% to 45 wt.-%, based on the total weight of the starch solution or starch suspension.

According to yet another preferred embodiment of the inventive process for preparing self-binding pigment particle suspensions, in step c) the at least one starch is added to the aqueous pigment material suspension in an amount from 1 to 20 wt.-%, preferably 1 to 19 wt.-%, more preferably 1 to 18 wt.-%, based on the total weight of the dry pigment material in the aqueous pigment material suspension.

According to one preferred embodiment of the inventive process for preparing self-binding pigment particle suspensions, the solids content in step c) is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the aqueous pigment material suspension.

According to another preferred embodiment of the inventive process for preparing self-binding pigment particle suspensions, grinding step d) is carried out during and/or after step c), preferably during step c).

According to yet another preferred embodiment of the inventive process for preparing self-binding pigment particle suspensions, grinding step d) is carried out at a temperature from 10° C. to 40° C., preferably from 20° C. to 40° C. and most preferably from 20° C. to 30° C., e.g. at room temperature.

According to one preferred embodiment of the inventive process for preparing self-binding pigment particle suspensions, grinding step d) is carried out until the fraction of self-binding pigment particles having a particle size of less than 1 μm is greater than 10 wt.-%, preferably greater than 30 wt.-%, more preferably greater than 50 wt.-%, and most preferably greater than 70 wt.-%, based on the total weight of the pigment particles and/or until the fraction of self-binding pigment particles having a particle size of less than 2 μm is greater than 20 wt.-%, preferably greater than 40 wt.-%, more preferably greater than 60 wt.-%, and most preferably greater than 80 wt.-%, based on the total weight of the pigment particles.

According to yet another preferred embodiment of the inventive process for preparing self-binding pigment particle suspensions, the pigment material in the obtained self-binding pigment particle suspension has a surface charge density in the range of +2.5 μEq/g and −10 μEq/g, more preferably in the range of +2 μEq/g and −8 μEq/g and most preferably in the range of +0.5 μEq/g and −6 μEq/g.

According to one preferred embodiment of the inventive process for preparing self-binding pigment particle suspensions, the obtained self-binding pigment particle suspension has a Brookfield viscosity in the range of 1 to 3 500 mPas, preferably in the range of 10 to 3 000 mPas, more preferably in the range of 50 to 2 500 mPas and most preferably in the range of 50 to 2 000 mPas.

According to another preferred embodiment of the inventive process for preparing self-binding pigment particle suspensions, grinding step c) is carried out such that the amount of free starch in the obtained self-binding pigment particle suspension is less than 45 wt.-%, preferably less than 40 wt.-% and most preferably less than 35 wt.-%, based on the total amount of starch added in step c).

According to yet another preferred embodiment of the inventive process for preparing self-binding pigment particle suspensions, the process further comprises step e) of concentrating the obtained self-binding pigment particle suspensions such that the solids content in the suspension is at least 45 wt.-%, preferably from 45 wt.-% to 80 wt.-%, more preferably from 50 wt.-% to 80 wt.-% and most preferably from 55 wt.-% to 79 wt.-%, based on the total weight of the self-binding pigment particle suspension.

According to one preferred embodiment of the inventive process for preparing self-binding pigment particle suspensions, concentration step e) is carried out before or after step d).

According to another preferred embodiment of the inventive process for preparing self-binding pigment particle suspensions, before or during or after step c) and/or step d) a dispersing agent is added.

As set out above, the inventive process for preparing self-binding pigment particle suspensions comprises the steps a), b), c) and d). In the following, it is referred to further details of the present invention and especially the foregoing steps of the inventive process for preparing self-binding pigment particle suspensions.

Step a): Provision of an Aqueous Pigment Material Suspension

According to step a) of the process of the present invention, an aqueous pigment material suspension is provided.

The aqueous pigment material suspension is obtained by mixing a particulate pigment material with water. The pigment material to be processed according to the inventive process may be selected from calcium carbonate, calcium carbonate containing minerals, mixed carbonate based fillers, or mixtures thereof.

According to a preferred embodiment of the present invention, the pigment material is a calcium carbonate. Calcium carbonate may be a ground natural calcium carbonate, also named heavy calcium carbonate, a precipitated calcium carbonate, also named light calcium carbonate, a modified calcium carbonate or a mixture thereof.

"Ground natural calcium carbonate" (GNCC) in the meaning of the present invention is a calcium carbonate obtained from natural sources, such as limestone, marble, chalk and mixtures thereof, and processed through a wet and/or dry treatment such as grinding, screening and/or fractionating, for example by a cyclone or classifier.

"Modified calcium carbonate" (MCC) in the meaning of the present invention may feature a natural ground or precipitated calcium carbonate with an internal structure modification or a surface-reaction product. According to a preferred embodiment of the present invention, the modified calcium carbonate is a surface-reacted calcium carbonate.

"Precipitated calcium carbonate" (PCC) in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form.

In one preferred embodiment of the inventive process, the pigment material comprises a mixture of ground natural calcium carbonate, a precipitated calcium carbonate or a modified calcium carbonate. For example, if the pigment material comprises a mixture of ground natural calcium carbonate, the pigment material comprises a mixture of at least two pigment materials selected from limestone, marble and chalk. According to one embodiment of the present invention, the calcium carbonate-containing mineral comprises dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

The particulate pigment material of the aqueous pigment material suspension provided in step a) may have a particle size distribution as conventionally employed for the material (s) involved in the type of product to be produced. In general, it is preferred that the pigment material particles in the suspension have a weight median particle diameter $d_{50}$ value of from 0.05 µm to 100 µm, preferably from 0.1 µm to 60 µm and more preferably from 0.2 µm to 20 µm, most preferably from 0.3 µm to 10 µm, for example from 0.4 µm to 1 µm as measured using a Sedigraph™ 5120 of Micromeritics Instrument Corporation.

The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size at which 50 wt.-% of all particles are bigger or smaller than this particle size. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

In a preferred embodiment, the pigment material particles in the suspension exhibit a BET specific surface area of from 0.1 $m^2/g$ to 200 $m^2/g$, more preferably 3 $m^2/g$ to 25 $m^2/g$, most preferably 5 $m^2/g$ to 20 $m^2/g$ and even more preferably 6 $m^2/g$ to 15 $m^2/g$, measured using nitrogen and the BET method according to ISO 9277.

The pigment material particles of the present invention are suspended in water and thus form an aqueous suspension or slurry of pigment material.

Preferably, the aqueous pigment material suspension provided in step a) has a solids content from 1 wt.-% to 80 wt.-%, preferably from 5 wt.-% to 60 wt.-%, more preferably from 10 wt.-% to 50 wt.-% and most preferably from 15 wt.-% to 45 wt.-%, based on the total weight of the aqueous pigment material suspension.

The aqueous pigment material suspension provided in step a) preferably has a temperature of ≤40° C., preferably between 5° C. and 40° C., more preferably between 10° C. and 40° C. and most preferably between 15° C. and 30° C. For example, the aqueous pigment material suspension is provided at about room temperature.

In one preferred embodiment of the present invention, the aqueous pigment material suspension provided in step a) has a temperature of between 15° C. and 30° C. For example, the aqueous pigment material suspension provided in step a) has a temperature of about room temperature.

Step b): Provision of at Least One Amphoteric and/or Anionic Starch

According to step b) of the process of the present invention, at least one amphoteric and/or anionic starch is provided.

In one preferred embodiment of the present invention, the at least one amphoteric and/or anionic starch is composed of only one type of starch. In another preferred embodiment of the present invention, the at least one amphoteric and/or anionic starch is composed of a mixture of two or more types of starch. For example, the at least one amphoteric and/or anionic starch is composed of a mixture of two or more types of amphoteric starch or the at least one amphoteric and/or anionic starch is composed of a mixture of two or more types of anionic starch. Alternatively, the at least one amphoteric and/or anionic starch is composed of a mixture of two or more types of amphoteric and anionic starches.

According to the present invention, the at least one amphoteric and/or anionic starch is a homopolysaccharide. Preferably, the homopolysaccharide is composed of a plurality of repeating units (at least 10) of glucose. More preferably, the homopolysaccharide is a linear chain of 1,4-linked α-D-glucopyranosyl units.

Additionally or alternatively, the homopolysaccharide comprises α-D-glucopyranosyl units which are 1,6-linked to the linear chain of 1,4-linked α-D-glucopyranosyl units. In one preferred embodiment, the 1,6-linked α-D-glucopyranosyl units are also linked to a linear chain of 1,4-linked α-D-glucopyranosyl units.

Preferably, the at least one amphoteric and/or anionic starch of the present invention comprises amylose and/or amylopectin fractions. In this regard, it is preferred that the at least one amphoteric and/or anionic starch of the present invention is a dextrin.

The term "dextrin" in the meaning of the present invention refers to a carbohydrate product obtained by thermally degrading starch. The obtained thermally modified starch has a lower molecular weight compared to the starch before the thermal degradation. For example, more than 95 wt.-% of the dextrin has a molecular weight of below 1 000 000 g/mol, more preferably more than 96 wt.-% of the dextrin has a molecular weight of below 1 000 000 g/mol and most preferably, more than 97 wt.-% of the dextrin has a molecular weight of below 1 000 000 g/mol, based on the total weight of the dextrin. Preferably, more than 60 wt.-% of the dextrin has a molecular weight between 5 000 g/mol and 200 000 g/mol, more preferably more than 65 wt.-% of the dextrin has a molecular weight between 5 000 g/mol and 200 000 g/mol and most preferably more than 69 wt.-% of the dextrin has a molecular weight between 5 000 g/mol and 200 000 g/mol, based on the total weight of the dextrin. For example, between 30 and 40 wt.-% of the dextrin has a molecular weight between 5 000 g/mol and 25 000 g/mol and between 30 and 40 wt.-% of the dextrin has a molecular weight between 25 000 g/mol and 200 000 g/mol, based on the total weight of the dextrin. Preferably, between 32.5 and 37.5 wt.-% of the dextrin has a molecular weight between 5 000 g/mol and 25 000 g/mol and between 32.5 and 37.5 wt.-% of the dextrin has a molecular weight between 25 000 g/mol and 200 000 g/mol, based on the total weight of the dextrin.

The starches used to obtain the at least one amphoteric and/or anionic starch can be of any desired origin, provided that the at least one starch contains free hydroxyl groups which can be modified.

The term "modified" or "modified starch" in the meaning of the present invention refers to a starch and/or dextrin (thermally modified starch), wherein at least a part of the hydroxyl groups is replaced by anionic and/or cationic groups.

The at least one amphoteric and/or anionic starch can advantageously be chosen from amongst the native starches and/or chemically modified starches and/or thermally modified starches originated from starches selected from the group comprising wheat starch, corn starch, rice starch, potato starch, tapioca starch, maranta starch, sorghum starch and mixtures thereof. In one preferred embodiment of the present invention, the at least one amphoteric and/or anionic starch is native starch selected from the group comprising rice starch, potato starch and mixtures thereof. In another preferred embodiment of the present invention, the at least one amphoteric and/or anionic starch is chemically modified starch selected from the group consisting of rice starch, potato starch and mixtures thereof. In a further preferred embodiment of the present invention, the at least one amphoteric and/or anionic starch is thermally modified corn starch, e.g. a dextrin.

One specific requirement of the present invention is that the starch provided in the inventive process is at least one amphoteric and/or anionic starch.

If the at least one amphoteric and/or anionic starch is an anionic starch, the starch is preferably chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof.

In one preferred embodiment of the present invention, the starch is chemically modified with anionic groups selected from carboxyl groups and carboxymethyl groups.

Methods for preparing such anionic starches are known to the skilled person.

In one preferred embodiment, the at least one anionic starch has a degree of carboxylation in the range of 0.001 to 0.08, preferably in the range of 0.0025 to 0.06, more preferably in the range of 0.0025 to 0.05 and most preferably in the range of 0.008 to 0.05.

Additionally or alternatively, the at least one amphoteric and/or anionic starch is an amphoteric starch.

Preferably, if the at least one amphoteric and/or anionic starch is an amphoteric starch, the starch is chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. Additionally, the at least one amphoteric starch is chemically modified with cationic groups selected from the group comprising amino groups, immonium groups, ammonium groups, sulfonium groups, phosphonium groups and mixtures thereof.

For example, the at least one amphoteric starch is chemically modified with anionic groups selected from carboxyl groups and carboxymethyl groups. Additionally, the at least one amphoteric starch is chemically modified with cationic groups selected from tertiary amino groups and quaternary ammonium groups.

In one preferred embodiment, the at least one amphoteric starch is chemically modified with carboxymethyl groups as anionic groups and quaternary ammonium groups as cationic groups.

Methods for preparing such amphoteric starches are known to the skilled person.

Preferably, the at least one amphoteric starch is chemically modified with anionic groups as well as cationic groups such that the ratio between the degree of anionic substitution and the degree of cationic substitution ($DS_a/DS_c$) of the hydroxyl groups is more than 0.8 and preferably more than 0.9. In one especially preferred embodiment of the present invention, the hydroxyl groups of the at least one amphoteric starch are chemically modified with anionic groups as well as cationic groups such that the ratio between the degree of anionic substitution and the degree of cationic substitution ($DS_a/DS_c$) of the hydroxyl groups is equal 1.0.

Additionally or alternatively, the at least one amphoteric starch is chemically modified with anionic groups as well as cationic groups such that the ratio of the anionic charge to the cationic charge lies in the range from 55:45 to 45:55 Mol-%, more preferably in the range from 53:47 to 47:53 Mol-% and most preferably in the range from 51:49 to 49:51 Mol-%.

Suitable anionic and/or amphotheric starches are available from a wide variety of commercial sources. Useful anionic and/or amphotheric starches include the starches available from Cargill, Switzerland as C*icoat 07525 and C*Film 07311. Furthermore, useful anionic and/or amphotheric starches include also the starches available from Sigma-Aldrich, Switzerland as S7260 and S03967 and from Avebe U.A., The Netherlands as Perfectacote 35.

In one preferred embodiment of the present invention, the at least one amphoteric and/or anionic starch is provided in form of a starch solution or a starch suspension or a dry material. For example, the at least one amphoteric and/or anionic starch is provided in form of a starch suspension.

The term "starch solution" in the meaning of the present invention refers to a system comprising solvent and starch, wherein the particles of the at least one amphoteric and/or anionic starch are dissolved in the solvent. The term "dissolved" in the meaning of the present invention refers to systems in which no discrete solid particles are observed in the solvent, i.e. the at least one polysaccharide forms a hydrocolloidal solution.

The term "starch suspension" in the meaning of the present invention refers to a system comprising solvent and starch, wherein at least a part of the particles of the at least one amphoteric and/or anionic starch are present as insoluble solids in the solvent. Said term does not exclude that a part of the at least one amphoteric and/or anionic starch is dissolved in the solvent.

If the at least one amphoteric and/or anionic starch is provided in form of a starch solution, the solution can be in form of an aqueous solution, i.e. the at least one amphoteric and/or anionic starch is provided in water. Alternatively, the starch solution can be in form of an organic solution, i.e. the at least one amphoteric and/or anionic starch is provided in an organic solvent selected from the group comprising methanol, ethanol, acetone and mixtures thereof.

If the at least one amphoteric and/or anionic starch is provided in form of a starch solution, the solution is preferably prepared in that the at least one amphoteric and/or anionic starch is added to a solvent, preferably water, having a temperature of ≤40° C., preferably between 5° C. and 40° C., more preferably between 10° C. and 40° C. and most preferably from 15° C. to 30° C. For example, the solution is prepared in that the at least one amphoteric and/or anionic starch is added to water having about room temperature.

Alternatively, the at least one amphoteric and/or anionic starch is provided in form of a starch suspension, which may be preferably prepared in that the at least one amphoteric and/or anionic starch is added to a solvent, preferably water, having a temperature of ≤40° C., preferably between 5° C. and 40° C., more preferably between 10° C. and 40° C. and most preferably from 15° C. to 30° C.

In one preferred embodiment, the starch suspension is prepared in that the at least one amphoteric and/or anionic starch is added to water at about room temperature.

In one preferred embodiment of the present invention, the at least one amphoteric and/or anionic starch is in form of a starch solution or starch suspension having a starch concentration ranging from 1 wt.-% to 50 wt.-%, preferably from 10 wt.-% to 50 wt.-%, more preferably from 15 wt.-% to 45 wt.-% and most preferably from 20 wt.-% to 45 wt.-%, based on the total weight of the starch solution or starch suspension.

If the at least one amphoteric and/or anionic starch is provided in form of a starch suspension, the suspension preferably comprises an amount of dissolved starch of less than 50 wt.-%, based on the total amount of starch added to the starch suspension. Preferably, the starch suspension preferably comprises an amount of dissolved starch of less than 40 wt.-%, preferably less than 35 wt.-% and most preferably less than 30 wt.-%, based on the total amount of starch in the starch suspension.

Additionally or alternatively, the starch suspension preferably comprises an amount of insoluble starch in the solvent of more than 50 wt.-%, based on the total amount of starch added to the starch suspension. Preferably, the starch suspension preferably comprises an amount of insoluble starch in the solvent of more than 60 wt.-%, preferably more than 65 wt.-% and most preferably more than 70 wt.-%, based on the total amount of starch in the starch suspension.

It is generally considered that the initial viscosity (before mixing the starch with the aqueous pigment material suspension in step c)) of the starch solution or starch suspension of the present invention is satisfactory with respect to the envisaged use. In particular, the starch solution or starch suspension has a Brookfield viscosity, measured at 25° C., 23-23.8° C. and 100 rpm with SPDL 2, except for Potato starch (e.g. 03967 of Fluka (Sigma-Aldrich)) which was measured with SPDL 5, in the range of 1 to 2 500 mPas, preferably in the range of 10 to 2 000 mPas, more preferably in the range of 20 to 1 500 mPas, even more preferably in the range of 20 to 1 000 mPas and most preferably in the range of 50 to 500 mPas.

Step c): Mixing the at Least One Starch with the Aqueous Pigment Material Suspension According to step c) of the process of the present invention, the at least one amphoteric and/or anionic starch of step b) is mixed with the aqueous pigment material suspension of step a).

In accordance with the present invention, the at least one amphoteric and/or anionic starch is added to the aqueous pigment material suspension in an amount from 0.5 to 20 wt.-%, based on the total weight of the dry pigment material in the aqueous pigment material suspension.

In one preferred embodiment of the present invention, the at least one amphoteric and/or anionic starch is added to the aqueous pigment material suspension in an amount from 1 to 20 wt.-%, preferably 1 to 19 wt.-% and most preferably 1 to 18 wt.-%, based on the total weight of the dry pigment material in the aqueous pigment material suspension.

The amount of the at least one amphoteric and/or anionic starch in the suspension can be adjusted by methods known to the skilled person. To adjust the amount of starch in the suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the suspension until the desired amount of the at least one amphoteric and/or anionic starch is obtained.

Additionally or alternatively, the solids content of the pigment material in step c) is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the aqueous pigment material suspension.

Additionally or alternatively, the solids content in step c) is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the aqueous pigment material suspension.

The solids content of the suspension can be adjusted by methods known to the skilled person. To adjust the solids content of an aqueous pigment material comprising suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the particulate material of the aqueous pigment material suspension (e.g. resulting from filtration) until the desired solids content is obtained. Additionally or alternatively, a self-binding pigment particle suspension having an appropriate lower content of solid particles may be added to the particulate material of the aqueous pigment material suspension until the desired solids content is obtained.

In the process of the present invention, the at least one amphoteric and/or anionic starch can be mixed with the aqueous pigment material suspension by any conventional mixing means known to the skilled person.

The aqueous pigment material suspension can be mixed with the at least one amphoteric and/or anionic starch in any appropriate form, e.g. in the form of a starch solution or a dry material. Preferably, the at least one amphoteric and/or anionic starch is in form of a starch solution.

In one preferred embodiment of the present invention, the at least one amphoteric and/or anionic starch is in form of an aqueous starch solution or starch suspension having a starch concentration from 1 wt.-% to 30 wt.-%, preferably from 1 wt.-% to 25 wt.-%, more preferably from 1 wt.-% to 20 wt.-% and most preferably from 1 wt.-% to 15 wt.-%, based on the total weight of dry pigment material in the aqueous pigment material suspension.

In one preferred embodiment of the present invention, the temperatures of the at least one amphoteric and/or anionic starch in form of a starch solution or starch suspension and the aqueous pigment material suspension are of about the same temperature.

Preferably, the temperature of the starch solution or starch suspension and the temperature of the aqueous pigment material suspension differ of not more than 15° C., more preferably not more than 10° C. and most preferably not more than 5° C.

For example, the aqueous pigment material suspension having a temperature of ≤40° C., preferably between 5° C. and 40° C., more preferably between 10° C. and 40° C. and most preferably from 15° C. to 30° C. is mixed with the at least one amphoteric and/or anionic starch in form of a starch solution or starch suspension. Preferably, the starch solution or starch suspension mixed into the aqueous pigment material suspension has a temperature of ≤40° C., preferably between 5° C. and 40° C., more preferably between 10° C. and 40° C. and most preferably from 15° C. to 30° C. In one preferred embodiment of the present invention, the aqueous pigment material suspension having a temperature of about room temperature is mixed with the at least one amphoteric and/or anionic starch in form of a starch solution or starch suspension having a temperature of about room temperature.

In one preferred embodiment of the present invention, the aqueous pigment material suspension obtained in step c) has a pH from 6 to 12, preferably from 6.5 to 10 and more preferably from 7 to 9.

Step d): Combining the Aqueous Pigment Material Suspension and Starch

According to step d) of the process of the present invention, the aqueous pigment material suspension and starch comprised in the mixture of step c) is combined by grinding.

The grinding process may be undertaken by all the techniques and grinders well known to the man skilled in the art for wet grinding. The grinding step may be carried out with any conventional grinding device, for example, under conditions such that comminution predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step d) may be carried out in batch or continuously, preferably continuously.

In one preferred embodiment of the present invention, the aqueous suspension to be ground has a pH from 6 to 12, preferably from 6.5 to 10 and more preferably from 7 to 9.

Additionally or alternatively, the aqueous suspension obtained after grinding has a pH from 6 to 12, preferably from 6.5 to 10 and more preferably from 7 to 9.

In one preferred embodiment of the present invention, grinding step d) is carried out at a temperature from 10° C. to 40° C., preferably from 20° C. to 40° C. and most preferably from 20° C. to 30° C. Preferably, grinding step d) is carried out at about room temperature.

In one preferred embodiment of the present invention, grinding step d) is carried out during and/or after step c). For example, grinding step d) is carried out during step c).

In one preferred embodiment of the present invention, the at least one amphoteric and/or anionic starch is added at the beginning of grinding step d).

In another preferred embodiment of the present invention, grinding step d) is carried out in batch or continuously. For example, grinding step d) is carried out continuously.

In one preferred embodiment of the present invention, grinding step d) is carried out until the fraction of self-binding pigment particles having a particle size of less than 1 μm is greater than 10 wt.-%, preferably greater than 30 wt.-%, more preferably greater than 50 wt.-%, and most preferably greater than 70 wt.-%, based on the total weight of the pigment particles, as measured with a Sedigraph 5120.

Additionally or alternatively, grinding step d) is carried out until the fraction of self-binding pigment particles having a particle size of less than 2 μm is greater than 20 wt.-%, preferably greater than 40 wt.-%, more preferably greater than 60 wt.-%, and most preferably greater than 80 wt.-%, based on the total weight of the pigment particles, as measured with a Sedigraph 5120.

Additionally or alternatively, the self-binding pigment particles obtained in step d) of the process of the present invention may have a weight median particle diameter $d_{50}$, measured according to the sedimentation method, in the range of from 0.05 μm to 3 μm, preferably from 0.1 μm to 2 μm and most preferably from 0.2 μm to 1 μm, for example from 0.3 μm to 0.8 μm. Additionally or alternatively, the self-binding pigment particles obtained in step d) may have a $d_{98}$ of below 2.5 μm. In one preferred embodiment of the present invention, the self-binding pigment particles obtained in step d) may have a $d_{98}$ in the range of from 0.3 μm to 15 μm, preferably from 0.5 μm to 5 μm and most preferably from 0.7 μm to 2.5 μm.

According to one specific requirement of the present invention, grinding step d) is carried out such that the amount of free starch in the obtained self-binding pigment particle suspension is less than 50 wt.-%, based on the total amount of starch added in step c).

The obtained self-binding pigment particle suspension may be also referred to as "starch-PHCH" or "starch-PHCH suspension".

In one preferred embodiment of the present invention, grinding step d) is carried out such that the amount of free starch in the obtained suspension is less than 45 wt.-%, preferably less than 40 wt.-% and most preferably less than 35 wt.-%, based on the total amount of starch added in step c).

Preferably, the obtained self-binding pigment particle suspension has a Brookfield viscosity in the range of 1 to 3 500 mPas, preferably in the range of 10 to 3 000 mPas, more preferably in the range of 50 to 2 500 mPas and most preferably in the range of 50 to 2 000 mPas.

Additionally or alternatively, the pigment material in the obtained self-binding pigment particle suspension has a surface charge density in the range of +2.5 μEq/g and −10 μEq/g, more preferably in the range of +2 μEq/g and −8 μEq/g and most preferably in the range of +0.5 μEq/g and −6 μEq/g.

In one preferred embodiment of the present invention, the self-binding pigment particles obtained in step d) exhibit a BET specific surface area of from 1 m²/g to 150 m²/g, more preferably 1.5 m²/g to 25 m²/g, most preferably 2 m²/g to 15 m²/g and even more preferably 2.5 m²/g to 10 m²/g, measured using nitrogen and the BET method according to ISO 9277.

In one preferred embodiment of the present invention, the solids content of the obtained self-binding pigment particle suspension in step d) is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the self-binding pigment particle suspension.

In one preferred embodiment of the present invention, the process of the present invention may lead directly to high solids suspension of self-binding pigment particles, i.e. an additional concentration step is not implemented in the process of the present invention.

If a high solids suspension of self-binding pigment particles is obtained, the solids content of the obtained suspension is at least 45 wt.-% and preferably from 45 wt.-% to 80 wt.-%, based on the total weight of the self-binding pigment particle suspension. For example, the solids content of the obtained suspension is from 50 wt.-% to 80 wt.-% and most preferably from 55 wt.-% to 79 wt.-%, based on the total weight of the self-binding pigment particle suspension.

In one preferred embodiment of the present invention, the process further comprises step e) of concentrating the obtained self-binding pigment particle suspension. In one preferred embodiment of the present invention, concentration step e) is carried out before or after step d). For example, concentration step e) is carried out before step d). Alternatively, concentration step e) is carried out after step d).

If step e) is implemented in the process of the present invention, the solids content in the obtained self-binding pigment particle suspension is adjusted such that it is at least 45 wt.-%, preferably from 45 wt.-% to 80 wt.-%, more preferably from 50 wt.-% to 80 wt.-% and most preferably from 55 wt.-% to 79 wt.-%, based on the total weight of the self-binding pigment particle suspension.

The solids content of the obtained self-binding pigment particle suspension can be adjusted by concentrating methods known to the skilled person. The concentrating of the corresponding pigment material suspension may be achieved by means of a thermal process, for example in an evaporator, or by means of a mechanical process, for example in a filter press such as nanofiltration, and/or centrifuge.

In one preferred embodiment of the present invention, the process comprises step e) of concentrating the obtained pigment material suspension such that the solids content in the obtained suspension is at least 55 wt.-%, more preferably at least 80 wt.-% and most preferably at least 90 wt.-%, based on the total weight of the self-binding pigment particle suspension.

In one preferred embodiment of the present invention, the process comprises step e) of concentrating the obtained self-binding pigment particle suspension such that a dry product is obtained.

The term "dry product" is understood to refer to pigment particles having a total surface moisture content of less than 0.5 wt.-%, preferably less than 0.2 wt.-% and more preferably less than 0.1 wt.-%, based on the total weight of the pigment particles.

If the inventive process further comprises step e) of concentrating the obtained self-binding pigment particle suspension such that a dry product or a suspension having a solids content of at least 55 wt.-%, more preferably at least 80 wt.-% and most preferably at least 90 wt.-%, based on the total weight of the self-binding pigment particle suspension, is obtained, the dry product or the suspension may be rediluted. If the dry product or the suspension is rediluted, the solids content in the obtained suspension is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the self-binding pigment particle suspension.

In one preferred embodiment of the present invention, a dispersing agent is added before or during or after process step c) and/or step d).

In one preferred embodiment of the present invention, the inventive process does not involve the use or addition of a dispersing agent during grinding.

In view of the very good results of the process for preparing self-binding pigment particle suspensions as defined above, a further aspect of the present invention refers to a self-binding pigment particle suspension which is obtainable by the process according to the present invention.

Such suspension contains self-binding pigment particles and an amount of free starch in the water phase of the suspension of less than 50 wt.-%, based on the total amount of starch added during the process. For example, the water phase of the self-binding pigment particles contains an amount of free starch of less than 45 wt.-%, more preferably less than 40 wt.-% and most preferably less than 35 wt.-%, based on the total amount of starch added during the process.

According to another aspect of the present invention, a paper product comprising self-binding pigment particles is provided, characterized in that the pigment particles are at least partially coated with at least one anionic and/or amphoteric starch.

It is preferred that the paper product comprising the inventive self-binding pigment particles has a dry pick resistance of at least 0.5 m/s, preferably at least 0.75 m/s and most preferably at least 1 m/s at a coating weight of 10 g/m².

The improved dry pick resistance of the products obtained from the self-binding pigment particle suspension of the present invention indicates a very good adhesion of the at least one anionic and/or amphotheric starch to the surface of the pigment particles and allows, thus, for the use of the inventive self-binding pigment particles in several applications, e.g., paper, paint, plastic, concrete and/or agriculture applications. Another application is the coating of tree leaves and/or plant leaves to reduce sun light and UV exposure of the leave surface.

According to a further aspect of the present invention, the self-binding pigment particle suspension obtainable by the inventive process is used in paper applications such as in paper coating. In one exemplary embodiment of the present invention, the self-binding pigment particle suspension is used in paper coating applications as a support for rotogravure and/or offset and/or digital printing and/or flexography and/or decoration surfaces. According to another aspect of the present invention, the self-binding pigment particle suspension obtainable by the inventive process is used in paper applications such as filler material. According to one exemplary embodiment of the present invention, the filler material is used in plastics, paint, concrete and/or agricultural applications. According to another exemplary embodiment of the present invention, the self-binding pigment particle suspension is used to reduce sun light and UV exposure of plant leaves.

It is to be understood that the advantageous embodiments described above with respect to the inventive process for making self-binding pigment particles also can be used for preparing or defining the inventive suspension, paper product and its use. In other words, the preferred embodiments described above and any combinations of these embodiments can also be applied to the inventive suspension, paper product and its use.

The scope and interest of the invention will be better understood based on the following examples which are intended to illustrate certain embodiments of the invention and are non-limitative.

EXAMPLES

A. Methods and Materials

In the following, materials and measurement methods implemented in the examples are described.

BET Specific Surface Area of a Material

The BET specific surface area was measured via the BET method according to ISO 9277 using nitrogen, following conditioning of the sample by heating at 250° C. for a period of 30 minutes. Prior to such measurements, the sample was filtered, rinsed and dried at 110° C. in an oven for at least 12 hours.

Particle Size Distribution (Mass % Particles with a Diameter<X) and Weight Median Diameter ($d_{50}$) of a Particulate Material Weight median grain diameter and grain diameter mass distribution of a particulate material were determined via the sedimentation method, i.e. an analysis of sedimentation behavior in a gravitational field. The measurement was made with a Sedigraph™ 5120.

The method and the instrument are known to the skilled person and are commonly used to determine grain sizes of fillers and pigments. The measurement was carried out in an aqueous solution of 0.1 wt.-% $Na_4P_2O_7$. The samples were dispersed using a high speed stirrer and ultrasonic.

Molecular Weight ($M_w$)

The average molecular weight (Mw) is measured as 100 mol-% sodium salt at pH 8 according to an aqueous Gel Permeation Chromatography (GPC) method calibrated with a series of five sodium polyacrylate standards supplied by Polymer Standard Service with references PSS-PAA 18 K, PSS-PAA 8K, PSS-PAA 5K, PSS-PAA 4K and PSS-PAA 3K.

pH of an Aqueous Suspension

The pH of the aqueous suspension was measured using a standard pH-meter at approximately 22° C.

Solids Content of an Aqueous Suspension

The suspension solids content (also known as "dry weight") was determined using a Moisture Analyser HB-S from the company Mettler-Toledo, Switzerland, with the following settings: temperature of 120° C., standard drying, 2.6 to 3.5 g of suspension.

Tablet Crushing Test

This test is a measure for the self-binding power of a pigment. It is a measure for the force needed to crush tablets that were formed from the self-binding pigment slurries.

To demonstrate the suitability for the self-binding character of the pigmentary particles thus obtained, tablets were formulated using a membrane filtration process. In this regard, an apparatus of the high-pressure filter press type was used, manufactured from a hollow steel tube. The said tube is closed at the top by a lid and contains the filtration membrane at the bottom.

Tablets were formed by applying a constant pressure (15 bar) to 80 ml of the starch PHCH suspension measured for 10 to 30 min such that water is released by filtration through a fine 0.025 µm filter membrane resulting in a compacted tablet. This method produces tablets of about 4 cm diameter with a thickness of 1.5 to 2.0 cm. The obtained tablets were dried in an oven at 60° C. for 24 hours.

The device and method used are described in detail in the document entitled "Modified calcium carbonate coatings with rapid absorption and extensive liquid uptake capacity" (Colloids and Surfaces A, 236 (1-3), 2003, pp. 91-102).

Subsequently, the tablets were fashioned by grinding into disc-shaped samples of 2.0-2.1 cm diameter with a thickness of 0.6-0.7 cm for the strength test analysis by using a disk mill (Jean Wirtz, Phoenix 4000). This procedure is described in the document entitled "Fluid transport into porous coating structures: some novel findings" (Tappi Journal, 83 (5), 2000, pp. 77-78). These smaller tablet discs were crushed under pressure to test their strength property by using the penetration apparatus Zwick/Roell Alround Z020 from the company Zwick GmbH & Co. KG, Ulm, Germany. The piston is brought down into contact with the sample at a deformation speed of 3 mm per minute, the test stops at 95% deformation or 20 kN. At the first local maximum in the measurement a crack in the sample occurred. The values given herein are the average of three, alternatively two to five, measurements of independently prepared tablets and the error bars are the standard deviation of these three measurements.

Polyelectrolyte Titration by Means of SCD

The polyelectrolyte titration was performed on the particle charge detector (Streaming current detector) Mütek PCD-03-pH of BTG Instruments GmbH, Herrsching, Germany by using the Mettler T90 titrator of Mettler-Toledo GmbH, Giessen, Germany.

The following ready-made solutions were used for the polyelectrolyte titration:

Cationic reagent: 0.0025 N Poly DADMAC (Poly(diallyldimethyl-ammonium-chloride) for anionic samples available from Sigma-Aldrich GmbH, Buchs, Switzerland.

Anionic reagent: 0.0025 N K-Polyvinyl-Sulfate (KPVS) for cationic samples available from WAKO Chemicals GmbH, Neuss, Germany.

Procedure

A solution was prepared in the detector by the addition of 0.5 ml KPVS (for cationic samples) to 10 ml distilled water. Then, the titration with Poly DADMAC was carried out until it is back to shortly after the equivalence point.

Experience shows that between 0.5 and 2.0 ml of 0.0025 molar reagent should be used up during the titration to obtain reproducible values. This means that in the case of KPVS (for cationic samples) with 0.0025 mol/l the consumption is between 1 and 4 ml.

Depending on the charge to be expected, the following weight-in quantities have to be chosen:

| Charge [µEq/g] | Weight-in [g] |
|---|---|
| 0.1 | 30.0 |
| 1.0 | 3.0 |
| 10.0 | 0.30 |
| 100.0 | 0.03 |

Small quantities were weighed into the detector by means of a tared single-use syringe. In case of slurries tending to rapid sedimentation the sample was drawn under stirring, by means of a tared syringe. The content of the syringe was then rinsed into the sample vessel by means of distilled water.

Subsequently, the detector was filled with distilled water up to the lower edge and the piston inserted carefully.

If a large volume has already been obtained due to a large weight-in quantity, it is filled up to a volume which is not exceeded in the subsequent comparison measurements. This end volume then applies for the subsequent measurements.

Then, the oppositely charged titration solution is added into the titrator and the top of the burette is fixed at the detector ensuring that it does not come into contact with the detector or the liquid.

The titrator is started according to the apparatus configuration. In particular, the titration is equilibrium controlled, i.e. the titrator adds, if necessary in several cycles, between 0.02 and 0.1 ml (in each cycle) of the respective cationic or anionic titration solution to the solution to be measured until a total signal change of about 8 mV is obtained. If the signal does not change by more than 2 mV per 2 seconds and a subsequent period of 5 to 60 seconds within each cycle, the titrator again adds between 0.02 to 0.1 ml of the respective cationic or anionic titration solution to the solution to be measured. The equivalence point is reached for each measurement at about 0 mV.

In case of computer-controlled titrators, the calculation of the charge is made automatically.

After each titration, the development of the titration was verified with the aid of the titration curve.

All values are based on the triple determination of the electrochemical charge.

The electrochemical charge has been determined by using the following equations:

$$\text{Charge } [\mu Eq/g] = \frac{V \cdot c \cdot z \cdot t}{E \cdot F} \cdot K$$

$[Coulomb/g] = [\mu Eq/g] \cdot 0.096485$

Conversion by the Faraday constant wherein:

anionic: $K = -1\,000$ cationic: $K = +1\,000$

| | |
|---|---|
| $V$: Consumption $KPVS/PolyDADMAC$ | [ml] |
| $c$: Conventration $KPVS/PolyDADMAC$ | [mol/l] |
| $t$: Titer/factor $KPVS/PolyDADMAC$ | |
| $E$: Weight-in quantity | [g] |
| $F$: Mass fraction solids, i.e. 50% solids ⇒ 0.50 | [g/g] |
| $z$: Valence (equivalence number) ⇒ mostly 1 | |

It should be noted that the unit "Eq" is equivalent to 1 proton, the charge of the proton being +1 e=1.602×10⁻¹⁹ As=1.602×10⁻¹⁹ C.

Adhesion Test

The adhesion test was carried out by determining the force necessary to separate a coating layer from a support. The ground suspensions were coated on a plastic support (PP foils) at a range of different coat weights using a laboratory coater Typ Model 624 from the company Erichsen, Germany. Polypropylene foils (YUPO Synteap foils) used in the adhesion test were obtained from the company Fischer Papier AG, Switzerland. The thickness of the white semi-matt foils was 80 µm. The adhesion was measured as follows:

20 mm of an adhesive-tape-strip (length around 30 mm, width 19 mm, Scotch™ magic 3M 810 produced by 3M) was stuck to the coated foil. The protruding end was attached to a spring balance (precision balance, type 20100 by Pesola, measurement range 0 to 100 g). After gluing the coated foil to the ground/base table, the spring balance was pulled vertically (angle of 90°) to the ground at a speed of around 30 cm/min wherein the deviation, i.e. the extension of the spring was measured. Adhesion of the coating to the PP-foil was determined by the weight required to induce a removal/de-bonding of the coating from the PP-foil. Values of greater than 100 g indicate that the coating did not de-bond during the measurement.

Brookfield Viscosity

The Brookfield viscosity of the self-binding pigment particles suspension and coating color were measured after one hour of production and after one minute of stirring at room temperature at 100 rpm by the use of a Brookfield viscometer type RVDVII+equipped with an appropriate spindle.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. with a capillary type 0a and corrected using the Hagenbach correction.

Dry Pick Resistance

Dry pick resistance was determined by a Multipurpose printability tester (Prüfbau Instruments) at 23° C. and a contact pressure of 150 N/cm. This test was carried out with increasing printing speed between 0 and 3 m/s. If no differentiation is obtained the printing is further carried out at a constant printing speed (starting at 3 m/s) with 0.5 m/s intervals until a printing speed of 6 m/s is reached. Low tack, normal tack and high tack ink (Michael Huber, Germany) were used as colour in an amount of 200 mm$^3$.

Brightness (R457)

Brightness was measured by using a spectrophotometer (Elrepho No. 1686, Datacolor) in accordance with DIN 53146. The term "brightness" as used in the context of the present invention is a measurement of the percentage of diffuse light reflected from a paper's surface. A brighter sheet reflects more light. As used herein, brightness of the paper may be measured at a mean wavelength of light of 457 nm and is specified in percent.

Opacity

Opacity was measured by using a spectrophotometer (Elrepho No. 1686, Datacolor) in accordance with DIN 53146. The term "opacity" as used in the context of the present invention is a measurement of the optical coverage of a paper. A more translucent paper is more see-through. The measurement is based on the relation between the reflections of a single paper sheet in front of a black background to a non-translucent stack of paper. The opacity of the paper is specified in percent. Values close to 100% correspond to a high opacity.

Light Scattering Coefficient "S" and Light Absorption Coefficient "K"

The light scattering coefficient "S" and the light absorption coefficient "K" were measured on sheets of synthetic paper (Yuko, Synteape, Fischer Papier AG, Switzerland). These paper sheets each having A4 paper size were subjected to a light radiation of wavelength 457 nm on a black plate using an Elrepho™ 450X, serial no 1686 spectrophotometer from Datacolor (Switzerland) to determine the degree of brightness (R457) of the coated papers on a black background (black trap) and on a stack of 15 non-coated sheets of paper.

A paper coating color was prepared by mixing 4 parts (on dry basis) of Acronal™ S 360 D, BASF, a paper coating styrene acrylic latex binder (8 parts of starch PHCH) and 100 parts (on dry basis) of the calcium carbonate suspension (which is a HCB95 slurry at s.c. 78%). Alternatively, the starch PHCH was used directly as a paper coating color. The coating color is then applied on the pre-weighed paper sheets in different coating weights ranging from 4 g/m$^2$ and 56 g/m$^2$ by using the rod bench top coater, Rakelauftragsgerät K-Control-Coater K202, Model 624 from Erichsen, Hemer, Germany.

Subsequently, the coated paper sheets were dried until a constant weight was reached, e.g. by drying the paper sheets at 150° C. on a belt dryer at a speed of 7.0 m/min.

The coated paper sheets with different coating weights of between 4 g/m$^2$ and 56 g/m$^2$ and samples of uncoated paper were then subjected to light radiation of wavelength 457 nm using an Elrepho™ 450X, serial n° 1686 spectrophotometer from Datacolor (Switzerland) on a black plate to determine the degree of whiteness (R457) of the paper on a black background (black trap) and on a pile of 15 non-coated sheets of paper. Subsequently, the coated paper sheets were cut into sheets each having dimensions of 16 cm*18 cm and weighed. The light scattering coefficient "S" and the light absorption coefficient "K" were then calculated in accordance with the Kubelka-Munk theory, which is well-known to experts, and described in the publications of Kubelka and Munk (Zeitschrift für Technische Physik 12, 539, (1931)), and of Kubelka (J. Optical Soc. Am. 38(5), 448, (1948) and J. Optical Soc. Am. 44(4), 330, (1954)). The light scattering coefficient "S" and the light absorption coefficient "K" are quoted as the value interpolated at the coat weight 20 g/m$^2$.

Glossiness (75° Tappi (ISO 8254-1)

The 75° glossiness of the sheet of paper previously coated was determined by the TAPPI method in accordance with ISO 8254-1 by using a Lehmann™ laboratory glossmeter (Lehmann LGDL-05.3) before as well as after calendering. As used herein, glossiness of the paper is specified in percent.

Chemical Oxygen Demand

Chemical oxygen demand (COD) was measured according to the Lange Method (ISO 15705), as described in the document issued by HACH LANGE LTD, entitled "DOC042.52.20023.Nov08". Approximately, 100 ml of the liquid phase were added in a Lange CSB LCK 014 cuvette, covering a range between 1 000 and 10.000 mg/l and heated in the closed cuvette for two hours at 148° C. in a dry thermostat. This suspension was then analyzed according to the Lange Method.

Thermo Gravimetric Analysis

Thermo gravimetric analysis (TGA) was performed on the Mettler Toledo TGA/STDA 851$^e$ at 570° C. for 1 h in air (PPH Methode Q60B Hybrid, 570° C./1 h air).

Degree of Carboxylation

Degree of carboxylation was measured by a conductometric titration. The starch was added portion wise under stirring into water and stirred with a magnetic bar until a clear solution was obtained. The solution had a starch concentration of 3 wt.-%, based on the total weight of the solution. The solutions were shaked before use. The pH of the solution was adjusted to 3 by using aqueous HCl at 6% concentration. The solution was then titrated with 0.1 M aqueous NaOH and the pH and conductivity were measured.

At the beginning of titration, the conductivity decreased until it reached a minimum. The slope was negative and corresponds to the titration of excess HCl. Then the conductivity increased again with a weak slope which corresponds to the deprotonation of the anionic groups of the starch. At the end, the slope of conductivity increased more which corresponds to the excess of NaOH.

The measurement was repeated three times for each sample.

d/d

The term "d/d" refers to the dry amount based on the dry amount of pigment material.

B. Preparation and Testing of Self-Binding Pigment Particle Suspensions and Corresponding Coatings Example 1 (Comparative Example a) Preparation and Testing of the Self-Binding Pigment Particle Suspension A self-binding pigment particle suspension was prepared by using undispersed calcium carbonate ground with cationic starch.

A starch solution having a starch concentration of 20 wt.-%, based on the total weight of the solution, was prepared by stirring 13 wt.-% (d/d which corresponds to 15 pph starch on 100 pph calcium carbonate), based on the total weight of the dry pigment material in the calcium carbonate slurry and starch, of a commercially available cationic starch (C*film 05978, from Cargill) in water at a temperature of about 95° C.

10 kg of undispersed calcium carbonate slurry was prepared having a solids content of about 20 wt.-%, based on the total weight of the slurry. The particulate material of the slurry has a weight median particle diameter $d_{50}$ value of 0.7 µm (measured according to the sedimentation method). Furthermore, the particulate material (calcium carbonate) of the slurry had a specific surface area of 9.5 m²/g (measured using nitrogen and the BET method).

Subsequently, the calcium carbonate slurry was run through a Dynomill Multilab filled with 1 070 g (with 80% filler level) zirconium oxide/zirconium silicate grinding beads (0.6-1.0 mm) at about room temperature. The grinding chamber had a total volume of 600 cm³. The mill speed was set to 2 500 rpm and the flow was set to 500 cm³/min.

Within 9 min, starting at grinding start, the starch solution was blended through a peristaltic pump over a three way valve directly into the inlet of the Dynomill Multilab mill to 100 pph (d/d), based on the total weight of dry calcium carbonate in the slurry, of the calcium carbonate slurry at room temperature.

The calcium carbonate slurry was ground together with the starch solution to a target particle size of 98 wt.-% less than 2 µm and 80 wt.-% less than 1 µm, measured on a Sedigraph 5120. At the end of the grinding process, 4.99 ml (750 ppm based on the amount of water in the slurry) of a commercially available preserving agent (OmyAK, Rohm and Haas, Frankfurt, Germany) was added to the self-binding pigment particle suspension (starch PHCH-1 suspension) in circulation and stirred for 5 min. The obtained starch PHCH-1 suspension had a solids content of 20.9 wt.-%, based on the total weight of the suspension.

The polyelectrolyte titration of the starch PHCH-1 suspension gave a charge density of +4.5 µEq/g.

The details regarding the starch solution, calcium carbonate slurry and starch PHCH-1 suspension before up concentration as well as the trial conditions are summarized in Table 1.

TABLE 1

| Starch solution (cationic) | | | CaCO$_3$ slurry (undispersed) | | | Self-binding pigment particle suspension (Starch PHCH-1) | |
|---|---|---|---|---|---|---|---|
| pph (d/d) | s.c. [wt.-%] | T [° C.] | pph (d/d) | s.c. [wt.-%] | T [° C.] | s.c. [wt.-%] | Target PSD of grinding |
| 15 | 20 | 95 | 100 | 20 | RT | 20.9 | 98 wt.-% < 2 µm | s.c. = solids content;
RT = room temperature

Subsequently, the starch PHCH-1 suspension was concentrated by centrifugation (Centrifuge Rotina 420, Hettich Laborapparate) at 3 000 rpm for about 15 min. The obtained filter cake had solids content of 58.5 wt.-%, based on the total weight of the filter cake, and was rediluted to final solids content of about 44.2 wt.-%, based on the total weight of the filter cake.

The starch PHCH suspension as well as the filter cake comprising the self-binding pigment particles (starch PHCH-1) was, after drying, analyzed by thermogravimetric analysis (TGA). The TGA analysis for the starch PHCH suspension provided an amount of starch of 12.87 wt.-%, based on the total weight of the suspension. The TGA analysis for the filter cake provided an amount of starch of 4.84 wt.-%, based on the total weight of the filter cake.

From the measured details, it can be gathered that the amount of cationic starch found in the starch PHCH suspension (~12.87 wt.-%) corresponds widely to the amount of cationic starch blended into the calcium carbonate slurry during grinding (~13 wt.-%). However, from the amount of starch found in the filter cake (~4.84 wt.-%) it can be further concluded that approximately 8 wt.-% of the cationic starch blended into the calcium carbonate slurry during grinding must have gone into the water phase. Thus, it has to be assumed that the preparation of the starch PHCH suspension by grinding of calcium carbonate slurry with cationic starch results in a suspension in which about 62 wt.-%, based on the total weight of starch, is present in the form of free starch.

b) Preparation and Testing of Coating Colors Prepared from the Self-Binding Pigment Particle Suspension Two coating colors were prepared by using the starch PHCH-1 suspension (cationic) in the form of a filter cake having a solids content of 44.2 wt.-%, based on the total weight of the filter cake.

Coating Color-1 (Cationic)

100 pph of the starch PHCH-1 suspension (cationic) in the form of a filter cake having solids content of 44.2 wt.-% was used as pure coating color. Coating color-1 provided a Brookfield viscosity of 207 mPas.

The S-coefficient of coating color-1 was determined as being 210 m²/kg, while the K-coefficient was determined as being 0.271 m²/kg.

Coating color-1 was applied on two different base papers, Synteape, commercially available from Fischer Papier AG, Switzerland as well as SAPPI, commercially available from Sappi Magnostar GmbH, Austria. The base paper from Sappi Magnostar corresponds to an uncoated raw paper. Furthermore, each base paper was provided as calendered and uncalendered samples. The coatings have been applied with a rod bench top coater, Rakelauftragsgerät K-Control-Coater K202, Model 624 (Erichsen)/Fabr. No. 57097-4/ Rods 1-5 for the control of the liquid flow/Belt dryer 7.0 mmin$^{-1}$, 150° C.

Mechanical properties of the uncalendered samples were characterized by the dry pick resistance test which was carried out with coating weights between 5 g/m² and 31 g/m². The dry pick resistance test provided a pick velocity of below 0.5 m/s across all coat weights of both of the uncalendered paper samples.

The optical properties of the uncalendered paper samples were characterized by brightness, opacity and paper gloss for coating weights between 5 g/m² and 30 g/m². In addition thereto, the calendered paper samples were characterized by the paper gloss for coating weights between 5 g/m² and 30 g/m².

The results for the mechanical and optical properties of the tested papers can be gathered from Tables 2 to 4.

TABLE 2

Dry pick resistance

| Coating color | Synteape | | Sappi base paper | |
|---|---|---|---|---|
| | Coat weight [gm$^{-2}$] | Pick velocity [ms$^{-1}$] | Coat weight [gm$^{-2}$] | Pick velocity [ms$^{-1}$] |
| 1 | 5.2 | <0.5 | 13.1 | <0.5 |
| | 15.2 | <0.5 | 20.1 | <0.5 |
| | 30.2 | <0.5 | — | — |

Mechanical properties, like dry pick resistance, and the coat weights correspond to rods 1, 3 and 5

TABLE 3

Optical properties

| | Synteape | | | | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 1 | 5.2 | 91.1 | 93.7 | 26.6 | 69.1 |
| | 8.8 | 91.1 | 94.3 | 26.6 | 69.4 |
| | 15.2 | 91.5 | 95.7 | 27.2 | 69.6 |
| | 23.8 | 91.7 | 96.9 | 26.7 | 68.7 |
| | 30.2 | 91.9 | 97.5 | 25.9 | 68.4 |

The coat weights correspond to rods 1, 3, 4, 5

TABLE 4

Optical properties

| | Sappi base paper | | | | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 1 | 13.1 | 86.7 | 93.6 | 10.7 | 60.4 |
| | 15.1 | 87.0 | 94.4 | 12.2 | 60.6 |
| | 20.1 | 88.1 | 96.0 | 15.1 | 64.4 |

The coat weights correspond to rods 1, 2, 3, 4, 5

Coating Color-2 (Cationic)

Coating color-2 having a solids content of 60.1 wt.-%, based on the total weight of the coating color, was prepared by adding 8 pph (d/d) of the starch PHCH-1 suspension (cationic) in form of a filter cake having a solids content of 44.2 wt.-% to 100 pph (d/d) of a calcium carbonate slurry having solids content of 78 wt.-%, based on the total weight of the slurry. The particulate material of the calcium carbonate slurry has been wet ground in the presence of a sodium polyacrylate and has a weight median particle diameter $d_{50}$ value of 0.65 μm and a $d_{95}$ of less than 2 μm (all measured according to the sedimentation method) and a specific surface area of 14.8 m²/g (measured using nitrogen and the BET method). Furthermore, 4 pph (d/d) of commercially available styrene/acrylate basic latex as e.g. sold by the BASF Company under the name ACRONAL S 360 D™ was added. Coating color-2 provided a Brookfield viscosity of 96 mPas.

The S-coefficient of coating color-2 was determined as being 99 m²/kg while the K-coefficient was determined as being −0.09 m²/kg.

Coating color-2 was also applied on two different base papers, namely Synteape, commercially available from Fischer Papier AG, Switzerland as well as SAPPI, commercially available from Sappi Magnostar GmbH, Austria. The base paper from Sappi Magnostar corresponds to an uncoated raw paper. Furthermore, each base paper was provided as calendered and uncalendered sample. The coatings have been applied with a rod bench top coater, Rakelauftragsgerät K-Control-Coater K202, Model 624 (Erichsen)/Fabr. No. 57097-4/Rods 1-5 for the control of the liquid flow/Belt dryer 7.0 m/min, 150° C.

Mechanical properties of the uncalendered samples were characterized by the dry pick resistance test which was carried out with coating weights between 8 g/m² and 56 g/m². The dry pick resistance test provided a pick velocity of below 1 m/s across all coat weights of both of the uncalendered paper samples. In particular, on Synteape a pick velocity of 1.0 m/s was determined for a 8.1 g/m² coating weight, while at 22.7 g/m² coating weight the pick velocity was at 0.5 m/s and at 47.6 g/m² coating weight the pick velocity was below 0.5 m/s. In contrast thereto, on SAPPI, a pick velocity of below 0.5 m/s was determined for all coatings weights beginning at a coating weight of 16.3 g/m².

The optical properties of the uncalendered paper samples were characterized by brightness, opacity and paper gloss for coating weights between about 8 g/m² and 56 g/m². In addition thereto, the calendered paper samples were characterized by the paper gloss for coating weights between about 8 g/m² and 56 g/m².

The results for the mechanical and optical properties of the tested papers can be gathered from Table 5 to 7.

TABLE 5

Dry pick resistance

| Coating color | Synteape | | Sappi base paper | |
|---|---|---|---|---|
| | Coat weight [gm$^{-2}$] | Pick velocity [ms$^{-1}$] | Coat weight [gm$^{-2}$] | Pick velocity [ms$^{-1}$] |
| 2 | 8.1 | 1.0 | 16.3 | <0.5 |
| | 22.7 | 0.5 | 29.1 | <0.5 |
| | 47.6 | <0.5 | 55.8 | <0.5 |

Mechanical properties, like dry pick resistance, and the coat weights correspond to rods 1, 3 and 5

TABLE 6

Optical properties

| | Synteape | | | | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 2 | 8.1 | 90.9 | 93.2 | 60.3 | 79.2 |
| | 13.1 | 90.9 | 93.6 | 64.0 | 79.9 |
| | 22.7 | 91.0 | 94.3 | 66.7 | 80.1 |

TABLE 6-continued

Optical properties

| Coating color | Coat weight [gm$^{-2}$] | Brightness R-457 [%] | Opacity [%] | Paper gloss 75° Tappi [%] | |
|---|---|---|---|---|---|
| | | | | uncalendered | calendered |
| | 36.3 | 91.2 | 96.1 | 68.9 | 80.5 |
| | 47.6 | 91.2 | 96.7 | 70.7 | 80.7 |

The coat weights correspond to rods 1, 3, 4, 5

TABLE 7

Optical properties

Sappi base paper

| Coating color | Coat weight [gm$^{-2}$] | Brightness R-457 [%] | Opacity [%] | Paper gloss 75° Tappi [%] | |
|---|---|---|---|---|---|
| | | | | uncalendered | calendered |
| 2 | 16.3 | 86.2 | 92.2 | 21.3 | 66.8 |
| | 20.1 | 86.6 | 93.0 | 24.2 | 72.3 |
| | 29.7 | 87.4 | 94.8 | 29.3 | 74.9 |
| | 42.7 | 88.7 | 95.5 | 34.8 | 76.3 |
| | 55.8 | 88.7 | 97.0 | 34.7 | 76.3 |

The coat weights correspond to rods 1, 2, 3, 4, 5

Example 2 (Inventive Example a) Preparation and Testing of the Self-Binding Pigment Particle Suspension A self-binding pigment particle suspension was prepared by using undispersed calcium carbonate ground with a thermally modified starch in an amount of about 0.99 wt.-% (corresponds to 1 pph starch on 100 pph calcium carbonate) and about 4.76 wt.-% (corresponds to 5 pph starch on 100 pph calcium carbonate), respectively.

A starch suspension having a starch concentration of 40 wt.-%, based on the total weight of the suspension, was prepared by stirring 0.99 wt.-% (d/d which corresponds to 1 pph starch on 100 pph calcium carbonate), based on the total weight of the dry pigment material in the calcium carbonate slurry and starch, of a commercially available thermally modified starch (C*film 07311, from Cargill) in water at room temperature.

Furthermore, a starch suspension having a starch concentration of 40 wt.-%, based on the total weight of the suspension, was prepared by stirring 4.76 wt.-% (d/d; corresponds to 5 pph starch on 100 pph calcium carbonate), based on the total weight of the dry pigment material in the calcium carbonate slurry and starch, of a commercially available thermally modified starch (C*film 07311, from Cargill) in water at room temperature.

10 kg of undispersed calcium carbonate slurry was prepared having solids content of about 20 wt.-%, based on the total weight of the slurry. The particulate material of the slurry has a weight median particle diameter $d_{50}$ value of 0.74 μm (measured according to the sedimentation method). Furthermore, the particulate material of the slurry had a specific surface area of 9.46 m$^2$/g (measured using nitrogen and the BET method).

Subsequently, the calcium carbonate slurry was run through a Dynomill Multilab filled with 1 070 g of (with 80% filler level) zirconium oxide/zirconium silicate grinding beads (0.6-1.0 mm) at about room temperature. The grinding chamber had a total volume of 600 cm$^3$. The mill speed was set to 2 500 rpm and the flow was set to 500 cm$^3$/min.

Within 5 and 10 min, respectively, starting at grinding start, each of the starch suspensions were blended through a peristaltic pump over a three way valve directly into the inlet of the Dynomill Multilab mill to 100 pph (d/d) of calcium carbonate slurry, based on the dry weight of the calcium carbonate in the slurry.

The obtained calcium carbonate slurries were ground together with the respective starch suspension to a target particle size of 98 wt.-% less than 2 μm and approx. 80 wt.-% of less than 1 μm, measured on a Sedigraph 5120. At the end of the grinding process, 5.3 ml (750 ppm based on the total amount of water amount) of a commercially available preserving agent (OmyAK, Rohm and Haas) was added to each of the self-binding pigment particle suspensions (starch PHCH suspensions) in circulation and stirred for 5 min. The obtained starch PHCH suspension prepared by adding about 0.99 wt.-% of the thermally modified starch had a solid content of 40 wt.-%, based on the total weight of the suspension, (starch PHCH-2) comprising particles having a charge density of +1.63 μEq/g while the obtained starch PHCH suspension prepared by adding about 4.76 wt.-% of the thermally modified starch had a solid content of 40 wt.-%, based on the total weight of the suspension, (starch PHCH-3) comprising particles having a charge density of −0.87 μEq/g.

The details regarding starch suspensions, calcium carbonate slurries and starch PHCH suspensions as well as the trial conditions are summarized in Table 8.

TABLE 8

| Trial | Starch suspension (anionic) | | | CaCO$_3$ slurry (undispersed) | | | Self-binding pigment particle suspension (Starch PHCH) |
|---|---|---|---|---|---|---|---|
| | pph (d/d) | s.c. [wt.-%] | T [° C.] | pph (d/d) | s.c. [wt.-%] | T [° C.] | Target PSD of grinding |
| Starch PHCH-2 | 1 | 40 | RT | 100 | 20 | RT | 98 wt.-% < 2 μm |
| Starch PHCH-3 | 5 | 40 | RT | 100 | 20 | RT | 98 wt.-% < 2 μm | s.c. = solids content;
RT = room temperature

Subsequently, both starch PHCH (starch PHCH-2 and starch PHCH-3) suspensions were concentrated by centrifugation (Centrifuge Rotina 420, Hettich Laborapparate) at 3 000 rpm for about 15 min. The filter cake obtained from the starch PHCH-2 suspension had solids content of 59.3 wt.-%, based on the total weight of the filter cake, and was rediluted to final solids content of about 43 wt.-%, based on the total weight of the filter cake (starch PHCH-2). The filter cake obtained from the starch PHCH-3 suspension had solids content of 58 wt.-%, based on the total weight of the filter cake, and was diluted to final solids content of about 41.8 wt.-%, based on the total weight of the filter cake (starch PHCH-3). Furthermore, the supernatant of the starch PHCH-2 suspension had a pH of 8.17, while the supernatant of the starch PHCH-3 suspension had a pH of 7.95.

b) Preparation of Coating Colors Prepared from the Self-Binding Pigment Particle Suspension and Adhesion Tests The filter cakes starch PHCH-2 (coating color-3) and starch PHCH-3 (coating color-4) were used directly as coating colors without adding further additives. As reference a coating color having solids content of 33.2 wt.-%, based on the total weight of the coating color, was used. The reference coating color was prepared by diluting a calcium carbonate slurry having solids content of 67 wt.-%, based on the total weight of the slurry. The particulate material of this slurry had a weight median particle diameter $d_{50}$ value of 0.74 μm (measured according to the sedimentation method). Furthermore, the particulate material of the slurry had a specific surface area of 9.46 m$^2$/g (measured using nitrogen and the BET method).

The coating weights for the reference and the inventive starch PHCH samples used for the adhesion test as well as the test results are summarized in Table 9.

TABLE 9

| Trial | Coating weight [g/m$^2$] | | | Adhesion g (n = 5) | | |
|---|---|---|---|---|---|---|
| | rod 1 | rod 3 | rod 5 | rod 1 | rod 3 | rod 5 |
| Reference | 3.5 | 10.7 | 22.1 | 0 | 0 | 0 |
| Coating color-3 | 4.7 | 14.8 | 31.5 | 10.8 | 11.4 | 7.8 |
| Coating color-4 | 4.8 | 14.2 | 30.0 | 76.0 | 69.0 | 39.0 | n = number of repeat experiments/measurements

As can be gathered from the measured details, the coatings did not release or rip off the foil (de-bond). In particular, it can be gathered that a coating color prepared by using a calcium carbonate without an anionic and/or amphotheric starch shows no adhesion at all resulting thus in no binding power.

In contrast thereto, the coating color-3 comprising the inventive composition starch PHCH-2 (about 0.99 wt.-% or 1 pph starch) shows some binding power. Furthermore, the coating color-4 comprising the inventive composition starch PHCH-3 (about 4.76 wt.-% or 5 pph starch) shows a clear increase in binding power. This test is the result of the average of five measurements.

Example 3 (Inventive Example

Self-binding pigment particle suspensions were prepared by using undispersed calcium carbonate ground with a thermally modified starch at different temperatures.

A starch suspension having a starch concentration of 40 wt.-%, based on the total weight of the suspension, was prepared by stirring 13 wt.-% (d/d which corresponds to 15 pph starch on 100 pph calcium carbonate), based on the total weight of the dry pigment material in the calcium carbonate slurry and starch, of a commercially available thermally modified starch (C*film 07311, from Cargill) in water at room temperature.

10 kg of undispersed calcium carbonate slurry was prepared having solids content of about 20 wt.-%, based on the total weight of the calcium carbonate slurry, at about 20° C. The particulate material of the slurry had a weight median particle diameter $d_{50}$ value of 0.74 μm (measured according to the sedimentation method). Furthermore, the particulate material of the slurry had a specific surface area of 9.46 m$^2$/g (measured using nitrogen and the BET method).

Subsequently, the calcium carbonate slurry was run through a Dynomill Multilab filled with 1 070 g (with 80% filler level) zirconium oxide/zirconium silicate grinding beads (0.6-1.0 mm) at about room temperature.

The grinding chamber had a total volume of 600 cm$^3$. The mill speed was set to 2 500 rpm and the flow was set to 500 cm$^3$/min.

Within 10 min, starting at grinding start, the starch suspension was blended through a peristaltic pump over a three way valve directly into the inlet of the Dynomill Multilab mill to 100 pph (d/d) of the calcium carbonate slurry at a temperature of 20° C.

The calcium carbonate slurry was ground with the starch suspension to a target particle size of 98 wt.-% less than 2 μm and 80 wt.-% less than 1 μm, measured on a Sedigraph 5120. At the end of the grinding process, 750 ppm based on the amount of water (4.99 ml) of a commercially available preserving agent (OmyAK, Rohm and Haas) was added to the self-binding pigment particle suspension (starch PHCH suspension) in circulation and stirred for 5 min. The starch PHCH suspension obtained at 20° C. had solids content of 21.7 wt.-%, based on the total weight of the suspension (starch PHCH-4).

The details regarding the starch suspension, calcium carbonate slurry and starch PHCH suspension as well as the trial conditions are summarized in Table 10.

TABLE 10

| Trial | Starch suspension (anionic) | | | CaCO$_3$ slurry (undispersed) | | | Self-binding pigment particle suspension (Starch PHCH) | |
|---|---|---|---|---|---|---|---|---|
| | pph (d/d) | s.c. [wt.-%] | T [° C.] | pph (d/d) | s.c. [wt.-%] | T [° C.] | Target PSD of grinding | |
| Starch PHCH-4 | 15 | 40 | RT | 100 | 20 | 20 | 98 wt.-% < 2 μm | | s.c. = solids content;
RT = room temperature

Subsequently, the starch PHCH suspension was concentrated by centrifugation (Centrifuge Rotina 420, Hettich Laborapparate) at 3 000 rpm for about 15 min to solids content of 58.2 wt.-% (at 20° C.), based on the total weight of the filter cake. The filter cake obtained was diluted to final solids content of about 39 wt.-%, based on the total weight of the filter cake.

The obtained filter cake comprising the self-binding pigment particle (starch PHCH) was, after drying, analyzed by TGA and BET. The obtained supernatant was analyzed by COD and starch content.

Table 11 summarizes the measured details of the respective supernatant as well as the filter cake.

TABLE 11

| Trial | Supernatant | Filter cake (dried) | |
|---|---|---|---|
| | Starch content [mg/l] | TGA* [wt.-%] | BET [m$^2$/g] |
| Starch PHCH-4 | 5.559 | 8.2611 | 6.4 |

*The results are given for thermogravimetric analysis (TGA) 0-570° C. In this regard, it should be noted that the moisture in these results is included. According to the TGA, the following data are obtained:
Starch PHCH-4 0-180° C. 0.6416% (which is considered moisture)
180°-570° C. 7.6226% (which is considered starch, organics)

The amount of 7.6226 wt.-% starch in the filtercake corresponds to an amount of 58.6 wt.-% of the total amount of starch in the filtercake, based on the total amount of starch in the starch PHCH suspension, and therefore 41.4 wt.-% of starch is present as free starch (through loss during concentration as well as through microbial starch degradation).

Tablets were prepared from the self-binding pigment particle suspension and measured in the tablet crushing test with respect to the maximum force, $F_{max}$, required to make the first crack into a tablet. In particular, tablets were prepared from starch PHCH-4 obtained in this example. In particular, the tablets were formed by applying a constant pressure of 15 bar to the suspension for 30 min.

The effects of the self-binding pigment particle suspension on the maximum force, $F_{max}$, required to make the first crack into a tablet as measured in the tablet crushing test are outlined in Table 12.

TABLE 12

| Trial | $F_{max}$ [N] |
|---|---|
| Starch PHCH-4 | 507.4 |

The result corresponds to an average of 5 measurements.

From Table 12 it can be concluded that tablets prepared from a suspension made in accordance with the inventive process require a maximum force of about 507 N to make the first crack.

Example 4 (Inventive Example

Self-binding pigment particle suspensions were prepared by using undispersed calcium carbonate ground with a thermally modified starch or an anionic starch having a degree of carboxylation of about 0.0082 at different temperatures.

A starch suspension-1 having a starch concentration of 40 wt.-%, based on the total weight of the suspension, was prepared by stirring 13 wt.-% (d/d which corresponds to 15 pph starch on 100 pph calcium carbonate), based on the total weight of the dry pigment material in the calcium carbonate slurry and starch, of a commercially available thermally modified starch (C*film 07311, from Cargill) in water at room temperature.

A starch solution-2 having a starch concentration of 10 wt.-%, based on the total weight of the solution, was prepared by stirring 13 wt.-% (d/d which corresponds to 15 pph starch on 100 pph calcium carbonate), based on the total weight of the dry pigment material in the calcium carbonate slurry and starch, of a commercially available anionic starch having a degree of carboxylation of about 0.0082 (C*iCoat 07525, from Cargill) in water at room temperature. C*iCoat 07525 is a cold water soluble starch and thus dissolves at room temperature.

10 kg of undispersed calcium carbonate slurry was prepared having a solids content of about 20 wt.-%, based on the total weight of the slurry. The particulate material of the slurries had a weight median particle diameter $d_{50}$ value of 0.74 μm (measured according to the sedimentation method). Furthermore, the particulate material of the slurries had a specific surface area of 9.46 m²/g (measured using nitrogen and the BET method).

Subsequently, the calcium carbonate slurry was run through a Dynomill Multilab filled with 1 070 g (with 80% filler level) zirconium oxide/zirconium silicate grinding beads (0.6-1.0 mm) at about room temperature. The grinding chamber had a total volume of 600 cm³. The mill speed was set to 2 500 rpm and the flow was set to 500 cm³/min.

Within 10 to 15 min (15 minutes for suspension-1, 10 minutes for solution-2), starting at grinding start, the respective starch suspension/solution was blended through a peristaltic pump over a three way valve directly into the inlet of the Dynomill Multilab mill to 100 pph (d/d), based on the total weight of dry calcium carbonate in the slurry, of the calcium carbonate slurry at room temperature.

The respective calcium carbonate slurries were ground with the respective starch suspensions/solution to a target particle size of 98 wt.-% less than 2 μm and 80 wt.-% less than 1 μm, measured on a Sedigraph 5120. At the end of the grinding process, 750 ppm based on the amount of water in the starch PHCH suspension (4.8 ml for suspension-1, 5.3 ml for solution-2) of a commercially available preserving agent (OmyAK, Rohm and Haas) was added to each self-binding pigment particle suspension in circulation and stirred for 5 min.

The obtained starch PHCH suspension prepared by using starch suspension-1 had a solids content of 20.9 wt.-%, based on the total weight of the suspension, (starch PHCH-5) while the obtained starch PHCH suspension prepared by using starch solution-2 had a solids content of 21.2 wt.-%, based on the total weight of the suspension, (starch PHCH-6).

The details regarding starch suspension/solutions, calcium carbonate slurries and starch PHCH suspensions as well as the trial conditions are summarized in Table 13.

TABLE 13

| | Starch suspension/solution (anionic) | | | CaCO₃ slurry (undispersed) | | Self-binding pigment particle suspension (Starch PHCH) | |
|---|---|---|---|---|---|---|---|
| Trial | pph (d/d) | s.c. [wt.-%] | T [° C.] | pph (d/d) | s.c. [wt.-%] | T [° C.] | Target PSD of grinding |
| Starch PHCH-5 | 15 | 40 | RT | 100 | 20 | RT | 98 wt.-% < 2 μm |
| Starch PHCH-6 | 15 | 10 | RT | 100 | 20 | RT | 98 wt.-% < 2 μm | s.c. = solids content;
RT = room temperature

Subsequently, all slurries were centrifuged (Centrifuge Rotina 420, Hettich Laborapparate) at 3 000 rpm for about 15 min. The obtained filter cakes were rediluted to final solids content of about 39.6 wt.-% (starch PHCH-5), based on the total weight of the filter cake and 44.5 wt.-% (starch PHCH-6), respectively.

The obtained filter cakes comprising the self-binding pigment particles (starch PHCH) were, after drying, analyzed by TGA at 0 to 570° C. (not stepwise). The filter cake of starch PHCH-5 comprises an amount of 7.82 wt.-% (including moisture) starch, corresponding to an amount of 60.15 wt.-% of the total amount of starch in the filtercake, i.e. an amount of free starch of 39.85 wt.-%.

b) Preparation and Testing of Coating Colors Prepared from the Self-Binding Pigment Particle Suspensions Coating colors were prepared by using the starch PHCH suspensions of this Example in the form of the respective filter cake.

Coating Color-5

100 pph of the starch PHCH-5 suspension in the form of a filter cake having solids content of about 39.6 wt.-% was used as pure coating color. The S-coefficient of coating color-5 was determined as being 209 m²/kg, while the K-coefficient was determined as being 0.235 m²/kg.

Coating Color-6

100 pph of the starch PHCH-6 suspension in the form of a filter cake having solids content of about 44.5 wt.-% was used as pure coating color. Coating color-6 provided a Brookfield viscosity of 90 mPas. The S-coefficient of coating color-6 was determined as being 205 m$^2$/kg, while the K-coefficient was determined as being 0.406 m$^2$/kg.

Coating colors-5 and 6 were applied on two different base papers, Synteape, commercially available from Fischer Papier AG, Switzerland as well as SAPPI, commercially available from Sappi Magnostar GmbH, Austria. The base paper from Sappi Magnostar corresponds to an uncoated raw paper. Furthermore, each base paper was provided as calendered and uncalendered sample. The coatings have been applied with a rod bench top coater, Rakelauftragsgerät K-Control-Coater K202, Model 624 (Erichsen)/Fabr. No. 57097-4/Rods 1-5 for the control of the liquid flow/Belt dryer 7.0 m/min, 150° C.

Mechanical properties of the uncalendered samples were characterized by the dry pick resistance test which was carried out with coating weights between 4 g/m$^2$ and 30.48 g/m$^2$. The results for the dry pick resistance test of the tested papers can be gathered from Table 14.

The optical properties of the uncalendered paper samples were characterized by brightness, opacity and paper gloss for coating weights between about 4 g/m$^2$ and 30.5 g/m$^2$. In addition thereto, the calendered paper samples were characterized by the paper gloss for coating weights between about 4 g/m$^2$ and 30.5 g/m$^2$. The results for the optical properties of the tested papers can be gathered from Tables 15 to 17.

TABLE 15

Dry pick resistance

| | Synteape | | Sappi base paper | |
|---|---|---|---|---|
| Coating color | Coat weight [gm$^{-2}$] | Pick velocity [ms$^{-1}$] | Coat weight [gm$^{-2}$] | Pick velocity [ms$^{-1}$] |
| 5 | 4.0 | <0.5 | 12.3 | <0.5 |
|   | 12.7 | <0.5 | — | — |
|   | 26.3 | <0.5 | — | — |
| 6 | 5.1 | 0.9 | 11.7 | <0.5 |
|   | 15.1 | <0.5 | 15.7 | <0.5 |
|   | 29.1 | <0.5 | — | — |

Mechanical properties, like dry pick resistance, and the coat weights correspond to rods 1, 3 and 5

TABLE 16

Optical properties

| | | | | Synteape | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 5 | 4.0 | 90.9 | 93.4 | 10.6 | 81.3 |
|   | 7.5 | 91.1 | 94.2 | 11.8 | 85.8 |
|   | 12.7 | 91.5 | 95.3 | 10.8 | 84.2 |
|   | 21.2 | 91.8 | 96.3 | 7.0 | 71.7 |
|   | 26.3 | 91.9 | 97.1 | 7.0 | 75.1 |

TABLE 16-continued

Optical properties

| | | | | Synteape | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 6 | 5.1 | 90.7 | 93.8 | 33.0 | 81.4 |
|   | 7.5 | 90.8 | 94.4 | 22.8 | 78.9 |
|   | 15.1 | 90.8 | 95.6 | 12.2 | 72.9 |
|   | 23.1 | 90.9 | 97.0 | 16.6 | 78.8 |
|   | 29.1 | 90.9 | 97.8 | 19.4 | 75.7 |

The coat weights correspond to rods 1, 2, 3, 4, 5

TABLE 17

Optical properties

| | | | | Sappi base paper | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 5 | 12.3 | 87.2 | 92.7 | 6.3 | 67.9 |
|   | 13.1 | 87.8 | 93.4 | 6.2 | 68.4 |
| 6 | 11.7 | 86.9 | 93.3 | 47.9 | 62.1 |
|   | 15.7 | 87.2 | 94.0 | 42.8 | 65.4 |
|   | 20.5 | 87.2 | 96.3 | 33.5 | 67.2 |

The coat weights correspond to rods 1, 2, 3, 4, 5

Coating Color-7

Coating color-7 having a solids content of 59.7 wt.-%, based on the total weight of the coating color, was prepared by adding 8 pph (d/d) of the starch PHCH-5 suspension in form of a filter cake having a solids content of 39.6 wt.-% to 100 pph (d/d) of a calcium carbonate slurry having solids content of 78 wt.-%, based on the total weight of the slurry. The particulate material of the calcium carbonate slurry has been wet ground in the presence of a sodium polyacrylate and has a weight median particle diameter $d_{50}$ value of 0.65 μm and a $d_{95}$ of less than 2 μm (all measured according to the sedimentation method) and a specific surface area of 14.8 m$^2$/g (measured using nitrogen and the BET method). Furthermore, 4 pph (d/d) of commercially available styrene/acrylate basic latex as e.g. sold by the BASF Company under the name ACRONAL S 360 D™ was added.

The S-coefficient of coating color-8 was determined as being 113 m$^2$/kg while the K-coefficient was determined as being 0.064 m$^2$/kg.

Coating Color-8

Coating color-8 having a solids content of 59.5 wt.-%, based on the total weight of the coating color, was prepared as described for coating color 7, except that the starch PHCH-6 suspension in form of a filter cake having a solids content of 44.5 wt.-% was used. Coating color-8 provided a Brookfield viscosity of 59 mPas. The S-coefficient of coating color-8 was determined as being 106 m$^2$/kg while the K-coefficient was determined as being −0.345 m$^2$/kg.

Coating colors-7 and 8 were also applied on two different base papers, namely Synteape, commercially available from Fischer Papier AG, Switzerland as well as SAPPI, commercially available from Sappi Magnostar GmbH, Austria. The base paper from Sappi Magnostar corresponds to an uncoated raw paper. Furthermore, each base paper was provided as calendered and uncalendered sample. The coatings have been applied with a rod bench top coater, Rakelauftragsgerät K-Control-Coater K202, Model 624 (Erichsen)/Fabr. No. 57097-4/Rods 1-5 for the control of the liquid flow/Belt dryer 7.0 mmin$^{-1}$, 150° C.

Mechanical properties of the uncalendered samples were characterized by the dry pick resistance test which was carried out with coating weights between 7.2 g/m$^2$ and 55.97 g/m$^2$. The dry pick resistance test provided a pick velocity of above 0.5 m/s across all coat weights for both of the uncalendered paper samples. The results for the dry pick resistance test of the tested papers can be gathered from Table 18.

The optical properties of the uncalendered paper samples were characterized by brightness, opacity and paper gloss for coating weights between 7.2 g/m$^2$ and 55.97 g/m$^2$. In addition thereto, the calendered paper samples were characterized by the paper gloss for coating weights between 7.2 g/m$^2$ and 55.97 g/m$^2$. The results for the optical properties of the tested papers can be gathered from Tables 19 and 20.

TABLE 18

Dry pick resistance

| | Synteape | | Sappi base paper | |
|---|---|---|---|---|
| Coating color | Coat weight [gm$^{-2}$] | Pick velocity [ms$^{-1}$] | Coat weight [gm$^{-2}$] | Pick velocity [ms$^{-1}$] |
| 7 | 7.2 | >3 | 15.6 | 1.2 |
|   | 21.6 | 1.8 | 29.2 | 0.8 |
|   | 46.4 | 0.6 | 56.0 | 0.8 |
| 8 | 7.4 | >3 | 17.0 | 1.0 |
|   | 21.8 | >3 | 29.0 | 0.6 |
|   | 46.6 | 0.7 | 55.5 | <0.5 |

Mechanical properties, like dry pick resistance, and the coat weights correspond to rods 1, 3 and 5

TABLE 19

Optical properties

| | | | | Synteape | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 7 | 7.2 | 90.8 | 93.0 | 76.4 | 98.3 |
|   | 12.3 | 90.9 | 93.7 | 77.9 | 98.3 |
|   | 21.6 | 90.9 | 94.8 | 64.5 | 92.7 |
|   | 35.2 | 91.0 | 95.9 | 82.0 | 98.9 |
|   | 46.4 | 91.0 | 96.5 | 81.8 | 96.4 |
| 8 | 7.4 | 90.8 | 93.3 | 72.0 | 87.6 |
|   | 12.5 | 90.8 | 93.7 | 72.0 | 93.2 |
|   | 21.8 | 90.9 | 94.6 | 78.9 | 92.6 |
|   | 34.3 | 90.9 | 94.8 | 67.6 | 91.3 |
|   | 46.6 | 91.0 | 96.5 | 68.6 | 91.2 |

The coat weights correspond to rods 1, 2, 3, 4, 5

TABLE 20

Optical properties

| | | | | Sappi base paper | |
|---|---|---|---|---|---|
| Coating color | Coat weight [gm$^{-2}$] | Brightness R-457 [%] | Opacity [%] | Paper gloss 75° Tappi [%] | |
| | | | | uncalendered | calendered |
| 7 | 15.6 | 86.5 | 91.4 | 19.2 | 78.1 |
|   | 21.1 | 87.0 | 92.5 | 21.4 | 71.6 |
|   | 29.2 | 87.6 | 93.8 | 22.2 | 76.1 |
|   | 42.6 | 88.3 | 95.6 | 25.4 | 80.9 |
|   | 56.0 | 88.7 | 96.5 | 24.9 | 75.1 |
| 8 | 17.0 | 86.9 | 91.5 | 18.7 | 76.4 |
|   | 20.4 | 87.1 | 92.5 | 18.9 | 77.2 |
|   | 29.0 | 87.7 | 94.0 | 20.4 | 80.5 |
|   | 41.9 | 88.3 | 95.6 | 23.1 | 82.9 |
|   | 55.5 | 88.8 | 96.5 | 24.6 | 83.5 |

The invention claimed is:

1. A self-binding pigment particle suspension obtained by a process comprising the following steps of:
   a) providing an aqueous pigment material suspension comprising pigment material, wherein the pigment material comprises calcium carbonate,
   b) providing a starch having a net negative charge and consisting of at least one anionic starch,
   c) mixing the starch of step b) with the aqueous pigment material suspension of step a), wherein the starch is added to the aqueous pigment material suspension in an amount from 0.5 to 20 wt.-%, based on the total dry weight of the pigment material in the suspension, and
   d) grinding the aqueous pigment material and starch of step c) during and/or after step c) at a temperature from 20° C. to 40° C., wherein grinding step d) is carried out to reduce the particle size of the pigment material of step a) and to obtain a fraction of self-binding pigment particles in which greater than 20 wt.-%, based on the total weight of the pigment particles have a particle size of less than 2 μm, as measured with a Mastersizer 2000, thereby obtaining the self-binding pigment particle suspension, wherein the self-binding pigment particle suspension comprises self-binding pigment particles at least partially coated with the starch and the amount of free starch in the self-binding pigment particle suspension is less than 50 wt.-% based on the total amount of starch added in step c) and the pigment material in the self-binding pigment particle suspension has a surface charge density after step d) in the range of +2.5 μEq/g and −10 μEq/g.

2. The self-binding pigment particle suspension according to claim 1, wherein the pigment material of step a) comprises calcium carbonate and one or more of-dolomite, a calcium associated with magnesium, clay, kaolin, titanium dioxide, talc, aluminium hydroxide, mica, synthetic fibers, or natural fiber.

3. The self-binding pigment particle suspension according to claim 1, wherein the pigment material is a ground natural calcium carbonate, a precipitated calcium carbonate, a modified calcium carbonate, or any mixture thereof.

4. The self-binding pigment particle suspension according to claim 1, wherein the pigment material is a ground natural calcium carbonate.

5. The self-binding pigment particle suspension according to claim 1, wherein the at least one-anionic starch of step b) is an anionic starch comprising anionic groups selected from the group consisting of carboxyl groups, carboxymethyl groups, carboxymethyl hydroxypropyl groups, carboxymethyl hydroxyethyl groups, phosphate groups, sulfonate groups, and any mixture thereof.

6. The self-binding pigment particle suspension according to claim 1, wherein the at least one-anionic starch of step b) is an anionic starch having a degree of carboxylation in the range of 0.001 to 0.08.

7. The self-binding pigment particle suspension according to claim 1, wherein in step c) the starch is added to the aqueous pigment material suspension in an amount from 1 to 20 wt.-%, based on the total weight of the dry pigment material in the aqueous pigment material suspension.

8. The self-binding pigment particle suspension according to claim 1, wherein the solids content in step c) is adjusted such that it is at least 1 wt.-%, based on the total weight of the aqueous pigment material suspension.

9. The self-binding pigment particle suspension according to claim 1, wherein grinding step d) is carried out during step c).

10. The self-binding pigment particle suspension according to claim 1, wherein grinding step d) is carried out until the fraction of self-binding pigment particles having a particle size of less than 1 μm is greater than 10 wt.-%, and/or until the fraction of self-binding pigment particles having a particle size of less than 2 μm is greater than 20 wt.-%, based on the total weight of the pigment particles.

11. The self-binding pigment particle suspension according to claim 1, wherein grinding step d) is carried out until the fraction of self-binding pigment particles having a particle size of less than 1 μm is greater than 70 wt.-%, and/or until the fraction of self-binding pigment particles having a particle size of less than 2 μm is greater than 80 wt.-%, based on the total weight of the pigment particles.

12. The self-binding pigment particle suspension according to claim 1, wherein the pigment material in the obtained self-binding pigment particle suspension has a surface charge density in the range of +2 μEq/g and −8 μEq/g.

13. The self-binding pigment particle suspension according to claim 1, wherein the pigment material in the obtained self-binding pigment particle suspension has a surface charge density in the range of +0.5 μEq/g and −6 μEq/g.

14. The self-binding pigment particle suspension according to claim 1, wherein the obtained self-binding pigment particle suspension has a Brookfield viscosity in the range of 1 to 3500 mPas.

15. The self-binding pigment particle suspension according to claim 1, wherein grinding step d) is carried out such that the amount of free starch in the obtained self-binding pigment particle suspension is less than 45 wt.-%, based on the total amount of starch added in step c).

16. The self-binding pigment particle suspension according to claim 1 further comprising performing a concentration step e) before step d), such that the solids content in the self-binding pigment particle suspension obtained after step d) is at least 45 wt.-% based on the total weight of the self-binding pigment particle suspension, and the self-binding pigment particle suspension comprises a fraction of self-binding pigment particles in which greater than 20 wt.-% based on the total weight of the pigment particles have a particle size of less than 2 μm as measured with a Mastersizer 2000, and self-binding pigment particles at least partially coated with the starch, and wherein the amount of free starch in the self-binding pigment particle suspension is less than 50 wt.-% based on the total amount of starch added in step c) and the pigment material in the self-binding pigment particle suspension has a surface charge density in the range of +2.5 μEq/g and −10 μEq/g.

17. The self-binding pigment particle suspension according to claim 1 further comprising performing a concentration step e) after step d), such that the solids content is the self-binding pigment particle suspension after step e) is at least 45 wt.-% based on the total weight of the self-binding pigment particle suspension, and the self-binding pigment particle suspension comprises a fraction of self-binding pigment particles in which greater than 20 wt.-% based on the total weight of the pigment particles have a particle size of less than 2 μm as measured with a Mastersizer 2000, and self-biding pigment particles at least partially coated with the starch, and wherein the amount of free starch in the self-binding pigment particle suspension is less than 50 wt.-% based on the total amount of starch added in step c) and the pigment material in the self-binding pigment particle suspension has a surface charge density in the range of +2.5 μEq/g and −10 μEq/g.

18. The self-binding pigment particle suspension according to claim 1, wherein before or during or after step c) and/or step d) a dispersing agent is added.

19. The self-binding pigment particle suspension according to claim 1, wherein the starch of step b) is in a form of a starch solution or starch suspension having a starch concentration from 1 wt.-% to 50 wt.-%, based on the total weight of the starch solution or starch suspension, and having a temperature of <40° C.

20. The self-binding pigment particle suspension according to claim 19, wherein the starch of step b) is in form of a starch solution or starch suspension having a starch concentration from 15 wt.-% to 45 wt.-%, based on the total weight of the starch solution or starch suspension.

* * * * *